US00RE49108E

(19) United States
(12) Reissued Patent
Li et al.

(10) Patent Number: US RE49,108 E
(45) **Date of Reissued Patent: *Jun. 14, 2022**

(54) SIMPLE TOPOLOGY TRANSPARENT ZONING IN NETWORK COMMUNICATIONS

(71) Applicant: Futurewei Technologies, Inc., Plano, TX (US)

(72) Inventors: Renwei Li, Fremont, CA (US); Huaimo Chen, Bolton, MA (US)

(73) Assignee: Futurewei Technologies, Inc., Plano, TX (US)

( * ) Notice: This patent is subject to a terminal disclaimer.

(21) Appl. No.: 15/455,668

(22) Filed: Mar. 10, 2017

Related U.S. Patent Documents

Reissue of:
(64) Patent No.: 8,976,711
Issued: Mar. 10, 2015
Appl. No.: 13/646,481
Filed: Oct. 5, 2012

U.S. Applications:
(60) Provisional application No. 61/545,050, filed on Oct. 7, 2011.

(51) Int. Cl.
*H04L 12/28* (2006.01)
*H04L 12/751* (2013.01)
*H04L 45/02* (2022.01)

(52) U.S. Cl.
CPC ..... *H04L 45/025* (2013.01)

(58) Field of Classification Search
CPC ..... H04L 45/025
USPC ..... 370/255
See application file for complete search history.

(56) References Cited

U.S. PATENT DOCUMENTS 5,666,652 A 9/1997 Lin et al.
6,085,102 A 7/2000 Dorenbosch
6,483,833 B1 * 11/2002 Jagannath ..... H04L 45/00 370/392
6,771,651 B1 * 8/2004 Beshai ..... H04L 29/12009 370/351
6,801,496 B1 10/2004 Saleh et al.
6,980,524 B1 12/2005 Lu et al.
7,002,917 B1 * 2/2006 Saleh ..... 370/238
(Continued)

FOREIGN PATENT DOCUMENTS

CN 1411214 A 4/2003
CN 1889517 A 1/2007
(Continued)

OTHER PUBLICATIONS

Chen, H., et al., "Applicability of OSPF Topology-Transparent Zone," draft-chen-ospf-tlz-app-00.txt, Jul. 9, 2012, 17 pages.
(Continued)

*Primary Examiner* — Nick Corsaro
(74) *Attorney, Agent, or Firm* — Conley Rose, P.C.

(57) ABSTRACT

An autonomous system (AS) comprising a topology transparent zone (TTZ) comprising a plurality of TTZ nodes, wherein the plurality of TTZ nodes includes an edge node and an internal node, wherein each of the plurality of TTZ nodes is configured to connect to another TTZ node via an internal link, and a plurality of neighboring external nodes connected to the TTZ edge nodes via a plurality of external links, wherein no link state advertisements (LSAs) describing the internal links are distributed to the neighboring external nodes.

26 Claims, 18 Drawing Sheets

(56) References Cited

U.S. PATENT DOCUMENTS

| | | | | |
|---|---|---|---|---|
| 7,457,277 | B1 | 11/2008 | Sharma et al. | |
| 7,603,671 | B2 | 10/2009 | Liu | |
| 8,018,873 | B1 | 9/2011 | Kompella | |
| 8,238,338 | B2 | 8/2012 | Swallow et al. | |
| 8,659,658 | B2 | 2/2014 | Vassigh et al. | |
| 8,964,732 | B2 * | 2/2015 | Li | H04L 45/02 370/386 |
| 9,306,808 | B2 * | 4/2016 | Li | H04L 45/02 |
| 2003/0014540 | A1 * | 1/2003 | Sultan et al. | 709/240 |
| 2003/0016678 | A1 | 1/2003 | Maeno | |
| 2004/0226015 | A1 | 11/2004 | Leonard et al. | |
| 2005/0025069 | A1 * | 2/2005 | Aysan | H04L 12/4641 370/254 |
| 2005/0068968 | A1 * | 3/2005 | Ovadia | H04L 45/04 370/396 |
| 2005/0152284 | A1 | 7/2005 | Kotha et al. | |
| 2006/0056328 | A1 * | 3/2006 | Lehane | H04L 45/02 370/315 |
| 2006/0098657 | A1 | 5/2006 | Vasseur et al. | |
| 2006/0268739 | A1 | 11/2006 | Garcia et al. | |
| 2007/0002738 | A1 * | 1/2007 | McGee | 370/230 |
| 2008/0101385 | A1 | 5/2008 | Elias et al. | |
| 2009/0172190 | A1 * | 7/2009 | Yadav | H04L 45/025 709/241 |
| 2010/0322244 | A1 | 12/2010 | Dasylva et al. | |

FOREIGN PATENT DOCUMENTS

| | | | |
|---|---|---|---|
| CN | 101568124 | A | 10/2009 |
| WO | 2008055539 | A1 | 5/2008 |
| WO | 2010148500 | A1 | 12/2010 |

OTHER PUBLICATIONS

Chen, H., et al., "OSPF Topology-Transparent Zone," draft-chen-ospf-tlz-02.txt, Jul. 16, 2012, 20 pages.
Bradner, S., et al., "Key Words for Use in RFCs to Indicate Requirement Levels," RFC 2119, Mar. 1997, 3 pages.
Moy, J., "OSPF Version 2," RFC 2328, Apr. 1998, 244 pages.
Coltun, R., "The OSPF Opaque LSA Option," RFC 2370, Jul. 1998, 15 pages.
Coltun, R., "OSPF for IPv6," RFC 2740, Dec. 1999, 81 pages.
Katz, D., et al., "Traffic Engineering (TE) Extensions to OSPF Version 2," RFC 3630, Sep. 2003, 14 pages.
Coltun, R., et al., "OSPF for IPv6," RFC 5340, Jul. 2008, 95 pages.
Vasseur, JP., Ed., et al., "Patch Computation Element (PCE) Communication Protocol (PCEP)," RFC 5440, Mar. 2009, 88 pages.
Chen, et al., "OSPF Topology-Transparent Zone," draft-chen-ospf-ttz-00.txt, Apr. 26, 2012, 20 pages.
Oran, Ed., "Osi Is-Is Intra-domain Routing Protocol," RFC 1142, Feb. 1990, 157 pages.
Bradner, "Key Words for Use 1n RFCs to Indicate Requirement Levels," BCP14, RFC 2119, Mar. 1997, 3 pages.
Moy, "OSPF Version 2," RFC 2328, Apr. 1998, 244 pages.
Coltun, et al., "The OSPF Opaque LSA Option," RFC 2370, Jul. 1998,15 pages.
Coltun, et al., "OSPF for IPv6," RFC 2740, Dec. 1999, 81 pages.
Katz, et al., "Traffic Engineering (TE) Extensions to OSPF Version 2," RFC 3630, Sep. 2003, 14 pages.
Llndem, Ed., et al., "Extensions to OSPF for Advertising Optional Router Capabilities," RFC 4970, Jul. 2007, 13 pages.
Coltun, et al., "OSPF for IPv6," RFC 5340, Jul. 2008, 94 pages.
Vasseur, et al., "Path Computation Element (PCE) Commumcation Protocol (Pcep)," RFC 5440, Mar. 2009, 87 pages.
Vasseur, et al., "A Backward-Recursive PCE-Based Computation (BRPC) Procedure to Compute Shortest Constrained Inter-Domain Traffic Engineering Label Switched Paths," RFC 5441, Apr. 2009, 18 pages.
Aggarwal, et al., "Advertising a Router''s Local Addresses 1n OSPF Traffic Engineering (TE) Extensions," RFC 5786, Mar. 2010, 8 pages.
Wang, D., et al., "OSPF For Routing Information Exchange Across Metro/Core Optical Networks" Optical Networks Magazine, SPIE, vol. 3, No. 5, XP001161643, Sep. 1, 2002, 10 pages.
Chen, H., et al., "OSPF Topology-Transparent Zone," draft-chen-ospf-ttz-01.b(t, Mar. 12, 2012, 22 pages.
Aggarwal, R., et al., "Advertising a Router's Local Addresses in OSPF Traffic Engineering (TE) Extensions," RFD 5786, Mar. 2010, 8 pages.
Foreign Communication from a Counterpart Application, PCT Application PCT/US2012/059096, International Search Report dated Jan. 10, 2013, 4 pages.
Tannenbaum, A. S., "Computer Networks," XP002689285, Prentice Hall, Chapter 5, Dec. 31, 1996, pp. 424-431.
Foreign Communications from a Counterpart Application, PCT Application PCT/US2012/059096, International Search Report dated Jan. 10, 2013, 4 pages.
Foreign Communication from a Counterpart Application, PCT Application PCT/US2012/059096, Written Opinion dated Jan. 10, 2013, 10 pages.
Li, R., et al., U.S. Appl. No. 13/372,596; Entitled, "System and Method for Topology Transparent Zoning in Network Communications," filed Feb. 14, 2012; Specification 34 pages; Drawing Sheets (Figures 1-15).
Oran, D., et al., "OSI IS-IS Intra-Domain Routing Protocol," RFC 1142, Feb. 1990, 157 pages.
Coltun, R., et al., "OSPF for IPv6," RFC 5340, Jul. 2008, 91 pages.
Vasseur, JP., Ed., et al., "Path Computation Element (PCE) Communication Protocol (PCEP)," RFC 5440, Mar. 2009, 88 pages.
Vasseur, JP., Ed., et al., "A Backward-Recursive PCE-Based Computation (BRPC) Procedure to Compute Shortest Constrained Inter-Domain Traffic Engineering Label Switched Paths," RFC 5441, Apr. 2009, 19 pages.

* cited by examiner

AMENDED

1210

| | | | | | |
|---|---|---|---|---|---|
| LS Age | | | | Options | LS Type = 1 |
| Link State ID | | | | | |
| Advertising Router | | | | | |
| Link State Sequence Number | | | | | |
| Link State Checksum | | | | Length | |
| V | E | B | Flags | Number of Links | |
| Router Link: node 461 to node 415 | | | | | |
| Router Link: node 461 to node 465 | | | | | |
| Router Link: node 461 to node 470 | | | | | |
| Router Link: node 461 to node 472 | | | | | |

FIG. 12A

1230

| | | | | | |
|---|---|---|---|---|---|
| LS Age | | | | Options | LS Type = 1 |
| Link State ID | | | | | |
| Advertising Router | | | | | |
| Link State Sequence Number | | | | | |
| Link State Checksum | | | | Length | |
| V | E | B | Flags | Number of Links | |
| Router Link: node 461 to node 415 | | | | | |
| Router Link: node 461 to node 463 | | | | | |
| Router Link: node 461 to node 465 | | | | | |
| Router Link: node 461 to node 467 | | | | | |

FIG. 12B

1250

<table>
<tr><td colspan="4">LS Age</td><td>Options</td><td>LS Type = 1</td></tr>
<tr><td colspan="6">Link State ID</td></tr>
<tr><td colspan="6">Advertising Router</td></tr>
<tr><td colspan="6">Link State Sequence Number</td></tr>
<tr><td colspan="4">Link State Checksum</td><td colspan="2">Length</td></tr>
<tr><td>V</td><td>E</td><td>B</td><td>Flags</td><td colspan="2">Number of Links</td></tr>
<tr><td colspan="6">Router Link: node 472 to node 461</td></tr>
<tr><td colspan="6">Router Link: node 472 to node 465</td></tr>
<tr><td colspan="6">Router Link: node 472 to node 476</td></tr>
<tr><td colspan="6">Router Link: node 472 to node 480</td></tr>
</table>

FIG. 12C

AMENDED

SIMPLE TOPOLOGY TRANSPARENT ZONING IN NETWORK COMMUNICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application *is a Reissue Application of U.S. Pat. No. 8,976,711 B2* (*issued on Mar. 10, 2015*), *which* claims priority to U.S. Provisional Patent Application No. 61/545,050 filed Oct. 7, 2011 by Renwei Li et al. and entitled "System and Method for Simple Topology Transparent Zoning in Network Communications", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As more and more nodes (e.g., routers) are added into a conventional communications network, the size of the network increases, and issues such as scalability and slow convergence may arise. In communication networks such as the Internet, an autonomous system (AS) may have a common routing policy (either in a single network or in a group of networks) that is controlled by a network administrator (or group of administrators on behalf of a single administrative entity, such as a university, a business enterprise, or a business division). Within the Internet, an AS comprises a collection of routers exchanging routing information via a common routing protocol. Each AS on the Internet may be assigned a globally unique number, which is sometimes called an AS number (ASN).

In a network comprising a single autonomous system (AS) with a single area, each node needs to be aware of the positional relationships (i.e., adjacencies) of all other nodes, such that all nodes may build a topological map of the AS. Nodes may learn about one another's adjacencies by flooding link-state information throughout the network according to one or more interior gateway protocols (IGPs) including, but not limited to, open shortest path first (OSPF) or intermediate system (IS) to IS (IS-IS). Specifically, nodes engaging in IGPs may distribute their own link state advertisements (LSAs) describing their own adjacencies to all their neighboring nodes, which may forward the received LSAs to all their neighboring nodes (except the node from which the LSA was received). This may allow the LSA to be distributed throughout the network such that all network nodes become aware of one another's adjacencies, thereby allowing the various nodes to build topology graphs (e.g., link state databases (LSDBs)). LSAs may be flooded upon network initialization as well as whenever a network adjacency changes (e.g., a node is added/removed or a node/link fails). A network change may lead to every node in the network to re-compute a shortest path to each destination, to update its routing information base (RIB) and its forwarding information base (FIB). Consequently, as more nodes are added to a network, link state distributions and shortest path computations may begin to consume more and more network resources, such as bandwidth and/or processing time.

A prior art technique for addressing scalability and performance issues in large networks is to define smaller areas of IGP (e.g., OSPF areas or IS-IS areas/levels) in an attempt to reduce the number of LSAs that are flooded throughout the network. This technique has been described by various publications, such as the Internet Engineering Task Force (IETF) publication request for comments (RFC) 2328 entitled "OSPF Version 2" (describing OSPF areas in an AS) and IETF publication RFC 1142 entitled "Open Systems Interconnection (OSI) IS-IS Intra-domain Routing Protocol" (describing IS-IS areas/levels in an AS). Specifically, each OSPF/IS-IS area comprises a number of interconnected routers, including both area border routers (ABRs) and internal routers. An ABR may be distinguished from an internal router in that the ABR may be connected to routers in two or more OSPF/IS-IS areas, while an internal router in an OSPF/IS-IS area may be connected only to other routers within the OSPF/IS-IS area. In most applications, the ABRs and internal routers will execute a normal link state distribution (e.g., according to an IGP) within their respective local OSPF/IS-IS areas, thereby allowing the ABRs to collect and summarize topology information (e.g., construct summary LSAs) describing their local OSPF/IS-IS area. Thereafter, the ABRs may distribute these summary LSAs to other ABRs on a backbone, thereby allowing the ABRs in external domains to develop a complete or partial topological understanding of the OSPF/IS-IS areas along the backbone. Depending on the network configuration, these summarized LSAs for an OSPF/IS-IS area may or may not be distributed to internal routers within the other OSPF/IS-IS areas.

Through splitting a network into multiple areas, the network may be further extended. However, there are a number of issues when splitting a network into multiple areas. For example, dividing an AS into multiple ASs or an area into multiple areas may involve significant network architecture changes. For another example, it may be complex to setup a multi-protocol label switching (MPLS) traffic engineering (TE) label switching path (LSP) crossing multiple areas. In general, a TE path crossing multiple areas may be computed by using collaborating path computation elements (PCEs) through the PCE communication protocol (PCEP), which may not be easy to configure by operators since manual configuration of the sequence of domains is required. Further, the current PCE method may not guarantee that the path found would be optimal. For yet another example, some policies may need to be reconfigured on ABRs for reducing the number of link states such as summary link-state advertisements (LSAs) to be distributed to other routers in other areas.

Furthermore, route convergence may be slower. A router in an OSPF area may see all other routers in the same area. A link-state change anywhere in an OSPF area may be populated everywhere in the same area, and may even be distributed to other areas in the same AS indirectly. For instance, all the routers and links in a point-of-presence (POP) in an OSPF area may be seen by all the other routers in the same area. Any link state change in the POP may be distributed to all the other routers in the same area, and may also be distributed to routers in other areas indirectly. A link state change in an area may lead to every router in the same area to re-calculate its OSPF routes, update its RIB and FIB. It may also lead to a number of link state distributions to other areas, which may trigger routers in other areas to re-calculate their OSPF routes, and update their RIBs and FIBs. Consequently, route convergence may become slower. As such, a simple and efficient scheme to address the above issues (e.g., in large networks) may be desired.

SUMMARY

In one embodiment, the disclosure includes an AS comprising a topology transparent zone (TTZ) comprising a plurality of TTZ nodes, wherein the plurality of TTZ nodes comprises an edge node and an internal node, wherein each of the plurality of TTZ nodes is configured to connect to another TTZ node via an internal link, and a plurality of neighboring external nodes connected to the TTZ edge nodes via a plurality of external links, wherein no link state advertisements (LSAs) describing the internal links are distributed to the neighboring external nodes.

In another embodiment, the disclosure includes a method of configuring a TTZ in an area of an AS, the method comprising assigning a TTZ identifier (ID) to a plurality of internal links that interconnect a plurality of TTZ nodes located within the TTZ, wherein each of the plurality of internal links interconnects a pair of the plurality of TTZ nodes, wherein the plurality of TTZ nodes includes at least one edge node and at least one internal node, sending a LSA from each of the at least one edge node via a plurality of external links to each of a plurality of neighboring external nodes located in the area, wherein each neighboring external node is connected to at least one of the edge nodes via at least one of the external links, and updating topology graphs in the neighboring external nodes based on each LSA, wherein the topology graphs do not contain any information regarding the at least one internal node or the plurality of internal links.

In yet another embodiment, the disclosure includes a router used in an area of an AS comprising a first port configured to connect to a first neighboring router via a first link, a second port configured to connect to a second neighboring router via a second link, and a topology graph configured to store information regarding the first and second neighboring routers, and the first and second links, wherein the first neighboring router and the second neighboring router are located within the area, wherein the first neighboring router does not contain any information regarding the second neighboring router or the second link, and wherein the second neighboring router contains information regarding the first neighboring router and the first link.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 12A-12C illustrate examples of router LSAs generated by different nodes.

FIG. 13 illustrates an embodiment of a method for configuring a disclosed TTZ in an AS.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Figure 1:
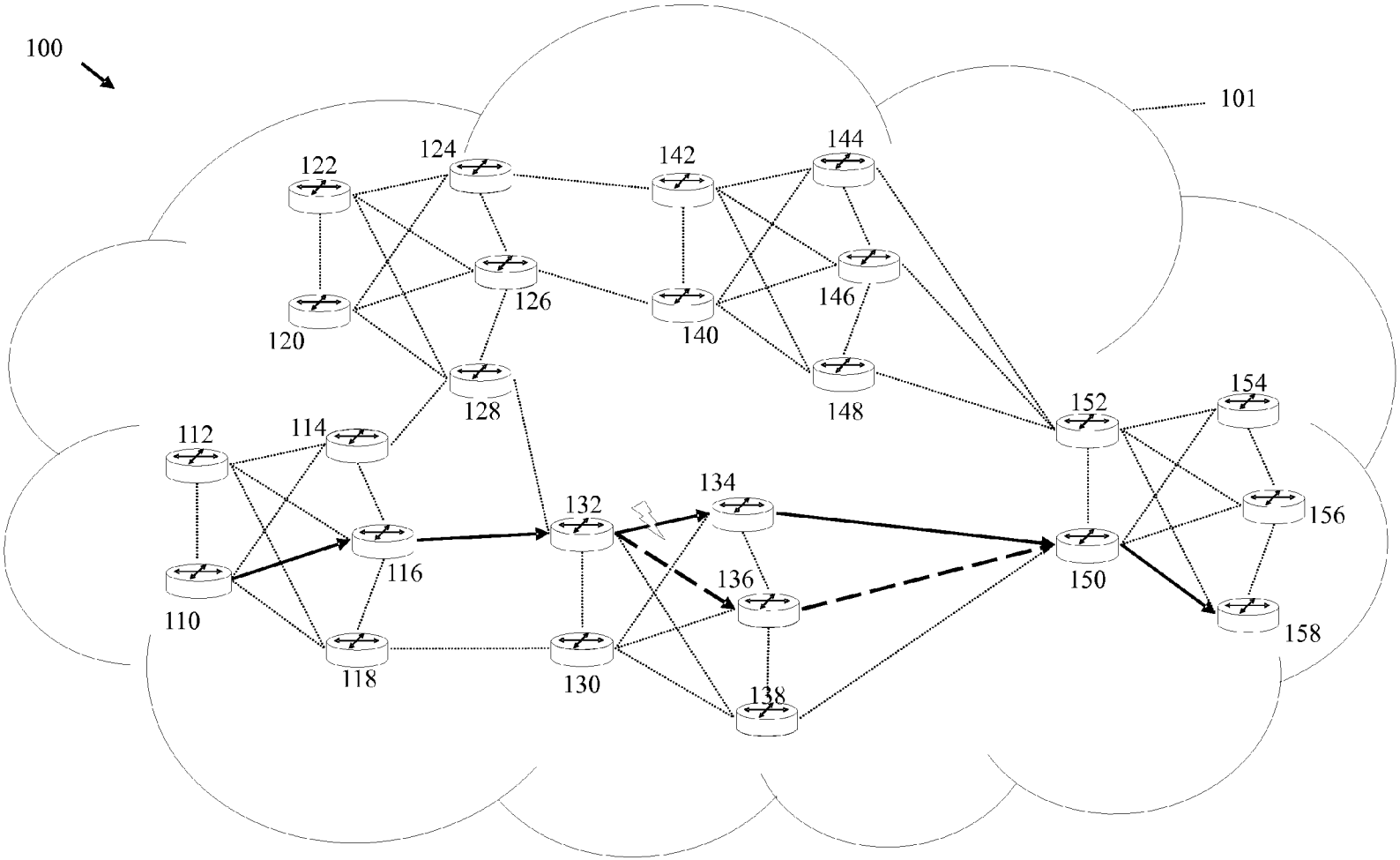
FIG. 1 illustrates an embodiment of an AS comprising a single area.

FIG. 1 illustrates an AS 100 comprising a single area 101. The area 101 comprises a plurality of nodes 110-158 that may collectively engage in a common link state distribution. For example, the nodes 110-158 may include a source node 110, a plurality of intermediate nodes 112-156, and a destination node 158, which are interconnected to form part of the internal architecture or topology of the AS 100. The nodes 110-158 may be devices (e.g., transceivers, routers, modems, etc.) capable of switching data in a deterministic manner throughout the AS 100. Each node may comprise one or more tables (e.g., LSDB, RIB and FIB tables) containing link state information that describes the topology of the AS 100. A LSP (indicated by solid arrows) may be established across the AS 100, which may allow traffic to be transported in a deterministic manner from one end of the AS 100 to the other. As shown, the LSP may extend from a source node 110 to a destination node 158 via one or more of the intermediate nodes 112-156.

As the AS 100 grows larger and larger (e.g., comprising more and more nodes), scalability issues may arise, which may result from, for example, the inability of a large network to quickly compute a shortest path to every destination on each node, efficiently manage or distribute network topology information. For instance, the processing and storage capabilities of an individual node (e.g., node 132) may practically limit the size of the AS 100. Additionally, the ability to distribute link state information in a timely manner may be directly related to the number of nodes in which LSAs need to be exchanged/flooded. Consequently, larger networks may suffer from slower convergence. For example, larger networks may require a longer period required to build or update topology graphs, during which time data may be misdirected or lost.

Re-convergence in large networks may also be an issue, as the inability to timely recover from a fault in a node/link (or some other condition that changes a network adjacency subsequent to initialization) may disrupt network services, such as the traffic transported from node 110 to node 158 along the shortest path as shown in FIG. 1 in the network. For example, in the event of a fault in the network, it may be necessary to flood LSAs throughout the AS 100 to inform each of the nodes 110-158 of the change in network topology. As used herein, the length of time required to distribute the topology information throughout the network (and update the appropriate RIB/FIB tables in the relevant nodes) may be referred to as a re-convergence period (or a convergence period if occurring during network initialization).

Re-convergence periods may significantly impact the ability to timely recover from faults in a path, and therefore affect the maximum Quality of Service (QoS) level supported by the network. Specifically, a network fault may affect one or more paths, which may be broken until a recovery procedure can be completed. For instance, a fault in the node 134 or the link between the nodes 132 and 134 may cause the path (solid arrows) to be temporarily broken. In response to detecting the fault, one or more of the nodes 110-158 may flood LSAs throughout the network to inform the other nodes of the topological change (i.e., that the adjacency between the nodes 132 and 134 no longer exists, or is temporarily unavailable). Subsequently, one or more of the nodes 110-158 may recompute a shortest path to every destination, update the RIB and FIB. Only after every node in the network receives the LSAs about the fault, recomputed the shortest path to every destination, and update the RIB and FIB, can transportation of the network traffic resume to normal. Hence, re-convergence periods directly affect the ability to timely recover from faults, and therefore substantially affect the ability of networks to meet QoS requirements of their various service agreements.

Figure 2A:
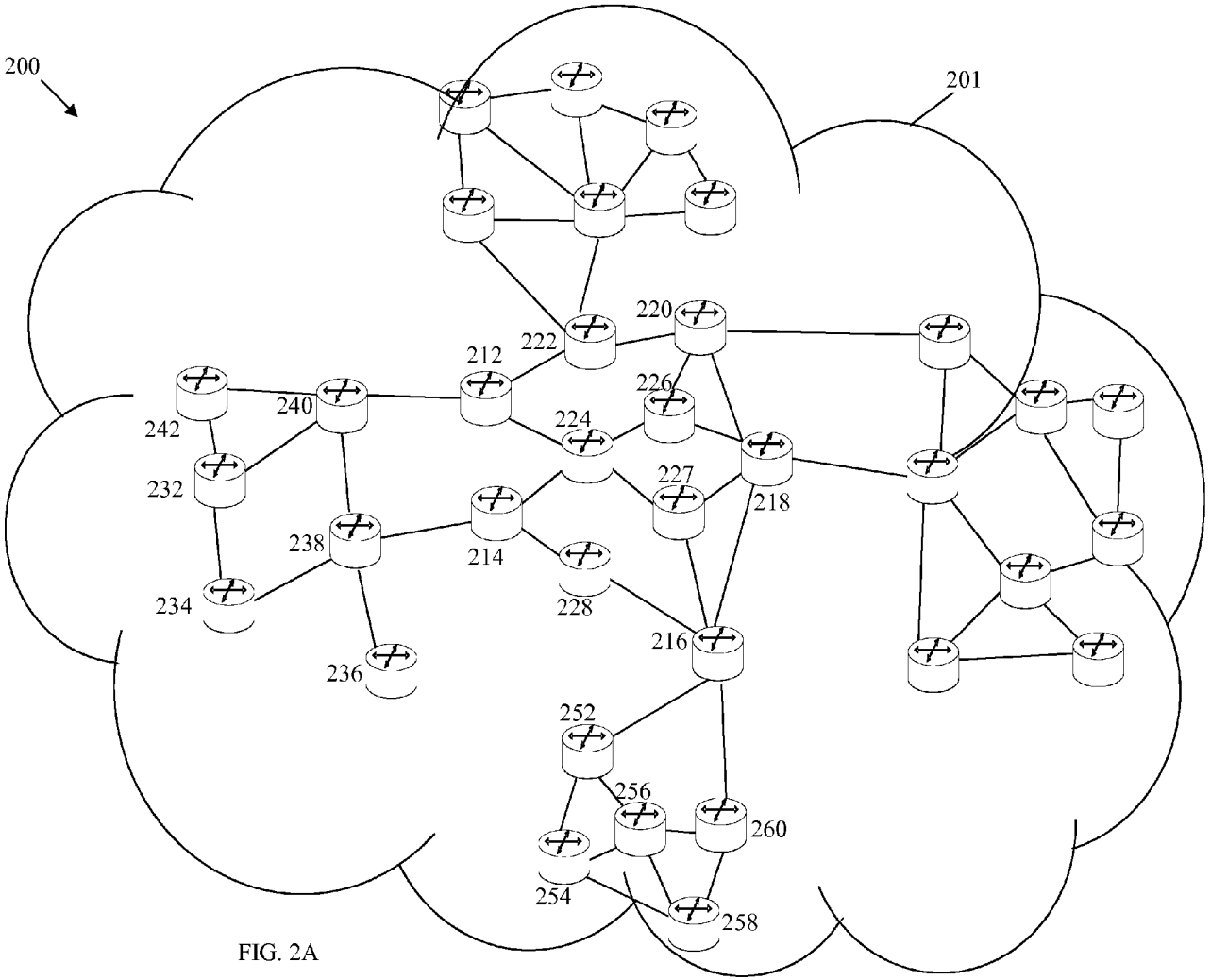
FIGS. 2A and 2B illustrate an AS divided into a plurality of areas.
Figure 2B:
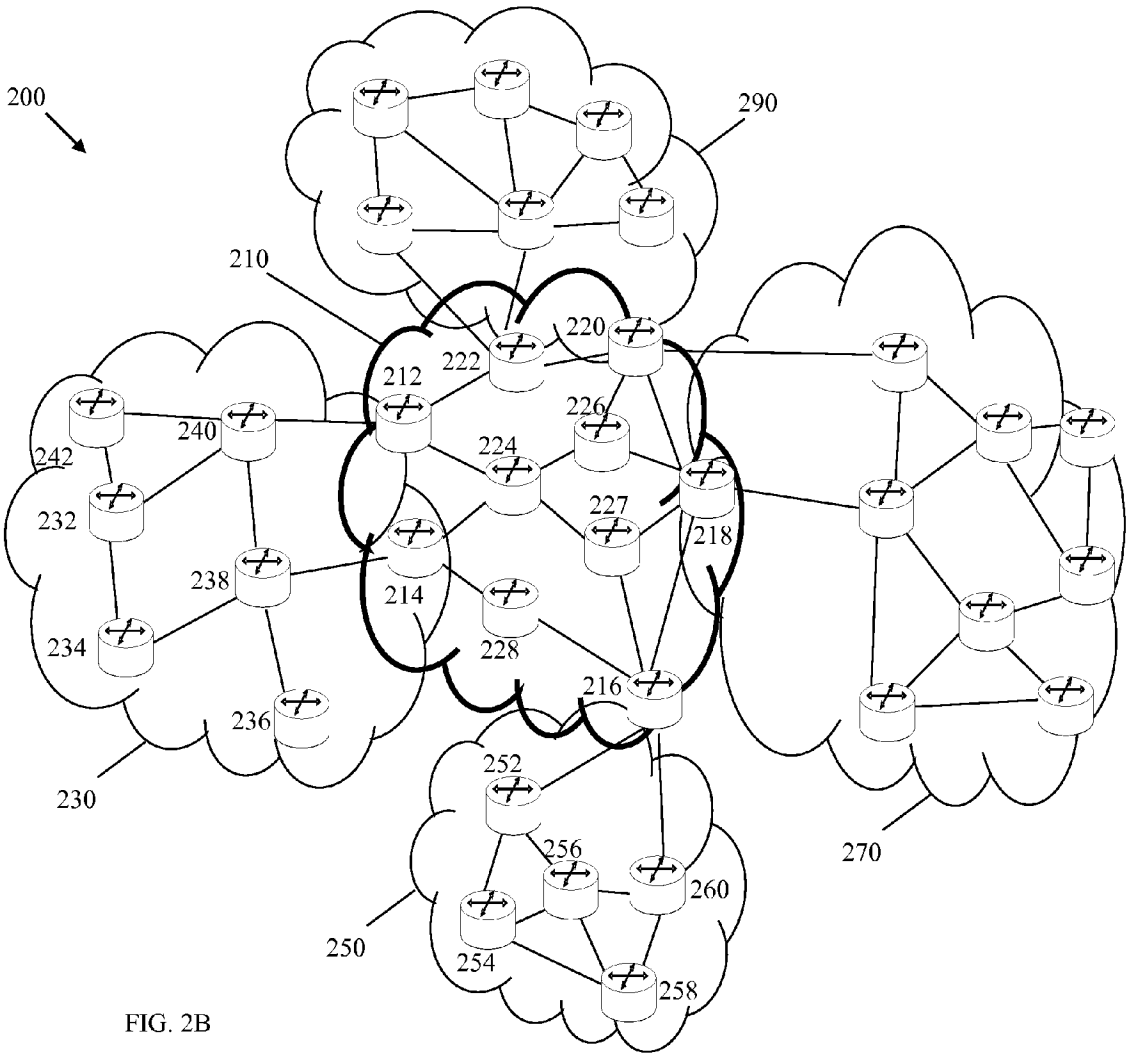

As discussed above, prior art techniques for dealing with scalability/convergence issues in large networks involve defining a plurality of OSPF/IS-IS areas within an AS. FIG. 2A illustrates an AS 200 comprising a single area 201, which may be similar to the area 101 in FIG. 1 except that the area 201 may comprise a relatively higher number of nodes. FIG. 2B illustrates the AS 200, originally comprising one area 201, divided into a plurality of areas (e.g., OSPF/IS-IS areas). After division, the AS 200 may comprise a plurality of areas 210, 230, 250, 270, and 290. Although five areas 210, 230, 250, 270, and 290 are depicted, those of ordinary skill in the art will understand that the AS 200 may comprise any number of areas. The area 210 may be a backbone area, while the other areas 230, 250, 270, and 290 may be non-backbone areas. The backbone area (sometimes referred as area 0) may serve as a center or backbone of the AS 200, and may be coupled to all other non-backbone areas (sometimes referred as areas 1, 2, . . . n, where n is an integer). Note that FIG. 2B only provides an example of dividing an area to a plurality of areas, thus it does not indicate that the number of nodes in an area has to surpass a certain threshold before the area can be divided.

The area 210 may comprise a plurality of area border nodes 212, 214, 216, 218, 220, and 222, each of which may, for example, be an area border router (ABR). The area 210 may further comprise one or more internal nodes 224, 226, 227, and 228. Each area border node (e.g., node 212) is connected to nodes in at least two areas (e.g., node 240 in area 230 and node 224 in area 210), while each internal node (e.g., node 224) is connected only to nodes inside an area (e.g., nodes 224 and 222 inside area 210). The area border nodes 212 and 214 may also serve as area border nodes of the area 230, which shares the nodes 212 and 214 with the area 210. The area 230 may further comprise a plurality of internal nodes 232, 234, 236, and 238, which may be configured similar to the internal nodes 224-228 in the area 210. The other areas 250-290 may each comprise a plurality of border nodes as well as a plurality of internal routers, and the configuration of the areas 250-290 is similar to the area 230. For example, the area 250 may comprise the area border node 216 and a plurality of internal nodes 252, 254, 256, 258, and 260.

LSAs comprising local link state information relevant to the area 210 may be distributed (e.g., flooded) to all the nodes 212-228 within the area 210, but not to internal nodes located in other areas, such as the nodes 232-242 in the area 230. Accordingly, the area border nodes 212-222 may collect and summarize the local link state information in area 210 into a summary LSA, and subsequently forward the summary LSA to relevant external nodes. For example, the area border nodes 212 and 214 may forward the summary LSA to the internal nodes 232-242 in the area 230. The other border nodes, such as node 216, may flood the summarized LSAs throughout their relevant area(s), such as the area 250.

As shown in FIG. 2B, dividing the area 201 into the areas 210, 230, 250, 270, and 290 may decrease link state distributions in the AS 200, thereby saving network resources (e.g., bandwidth) in comparison to the single area 201 in FIG. 2A. However, a link state distribution in the area 210 nevertheless triggers at least some link state distributions throughout the AS 200, which may cause other nodes (e.g., nodes 232-242) to re-calculate their OSPF or IS-IS routes, update their RIB and FIB tables, or take other actions that consume network resources (e.g., bandwidth and processor resources). Hence, while the prior art technique of dividing one OSPF/IS-IS area into a plurality of OSPF/IS-IS areas may partially address scalability/convergence issues, it fails to fully localize the distribution of local link state information within the OSPF/IS-IS area.

Figure 3A:
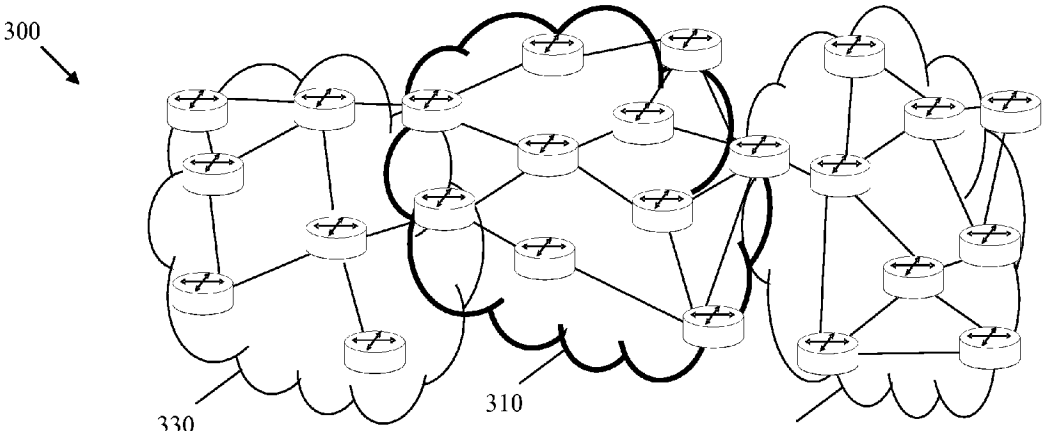
FIGS. 3A and 3B illustrate an AS separated into a plurality of ASs.

Further, as the number of nodes in an AS, such as the AS 200 which already comprises a plurality of areas, continues to grow, the AS may need to be divided into a plurality of autonomous systems (ASs). FIG. 3A illustrates an AS 300 comprising a plurality of areas 310, 330, and 350. The backbone area 310 may be configured similar to the backbone area 210 in FIG. 2, while the non-backbone areas (e.g., the area 330) may be configured to similar to the non-backbone areas (e.g., the area 230) in FIG. 2.

Figure 3B:
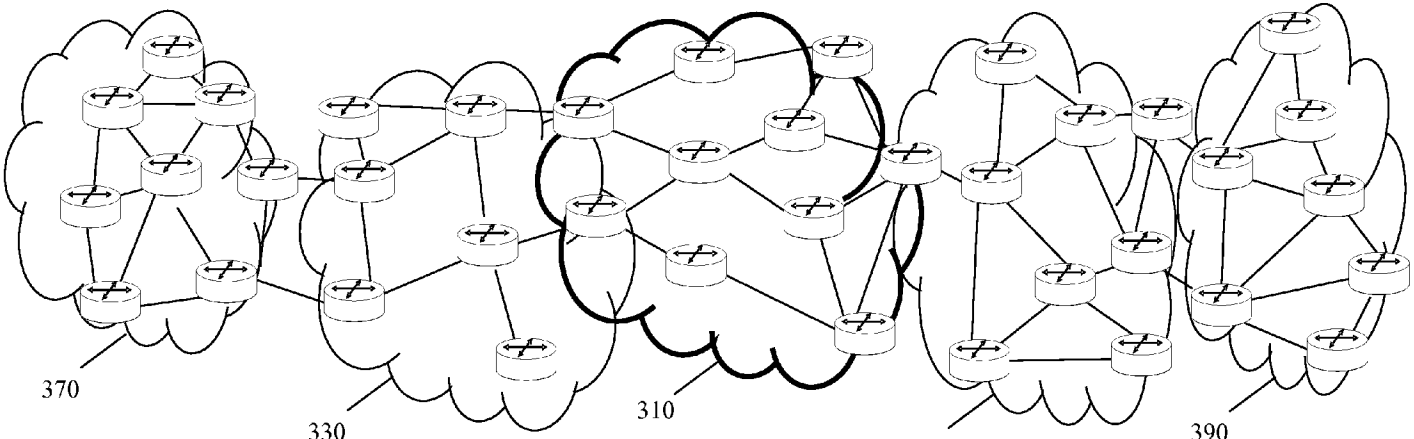

More nodes may be added into the AS 300 and form additional areas 370 and 390, as shown in FIG. 3B. After addition of the areas 370 and 390, the AS 300 becomes an even larger AS 360. If the size of the AS 360 continuously increases, issues such as slow convergence may eventually become too severe. In this case, the AS 360 may need to be separated into a plurality of ASs. For example, each of the additional areas 370 and 390 may be configured into a separate AS. Since nodes located in different ASs may not share routing information, an overall number LSAs may decrease. However, to incorporate multiple ASs into a network which originally comprises one AS, the network architecture may need to be changed significantly, and service interruption may occur during transition.

Disclosed herein are systems and methods for creating one or more topology transparent zones (TTZs) in an AS to better address issues such as scalability and slow convergence, while maintaining simplicity of implementation. Specifically, a TTZ disclosed herein may be configured in an area of the AS. The TTZ may comprise a plurality of TTZ nodes including at least one edge node and at least one internal node. The disclosed TTZ may further comprise a number of internal links between internal and/or edge nodes. The edge nodes may be connected to a number of nodes outside the TTZ, which are herein referred as external nodes, via a number of external links. The links discussed herein may be any type of electrical or optical link for transporting data. Information regarding the external nodes and the external links are distributed or flooded to each TTZ node. In an embodiment, information regarding the internal nodes and the internal links may only be distributed within the TTZ via LSAs. Consequently, link state distributions throughout the AS may be reduced. In practice, implementation of one or more TTZs may be more effective in reducing link state distributions than networks implementing OSPF/IS-IS areas, while being less complex than networks implementing PCE Communication Protocol (PCEP) for computing a path for Multi-Protocol Label Switching Traffic Engineering LSP (MPLS TE LSP) crossing multiple areas or ASs. Further, nodes within the TTZ have a topological understanding of the AS as a whole. Consequently, LSPs can be computed without relying on intermediaries (e.g., PCEs). As such, the TTZ techniques described herein may allow for improved network performance, including increased scalability, faster re-convergence, better performance, and reduced processing consumption, while still allowing paths for LSPs to be computed simply.

Figure 4A:
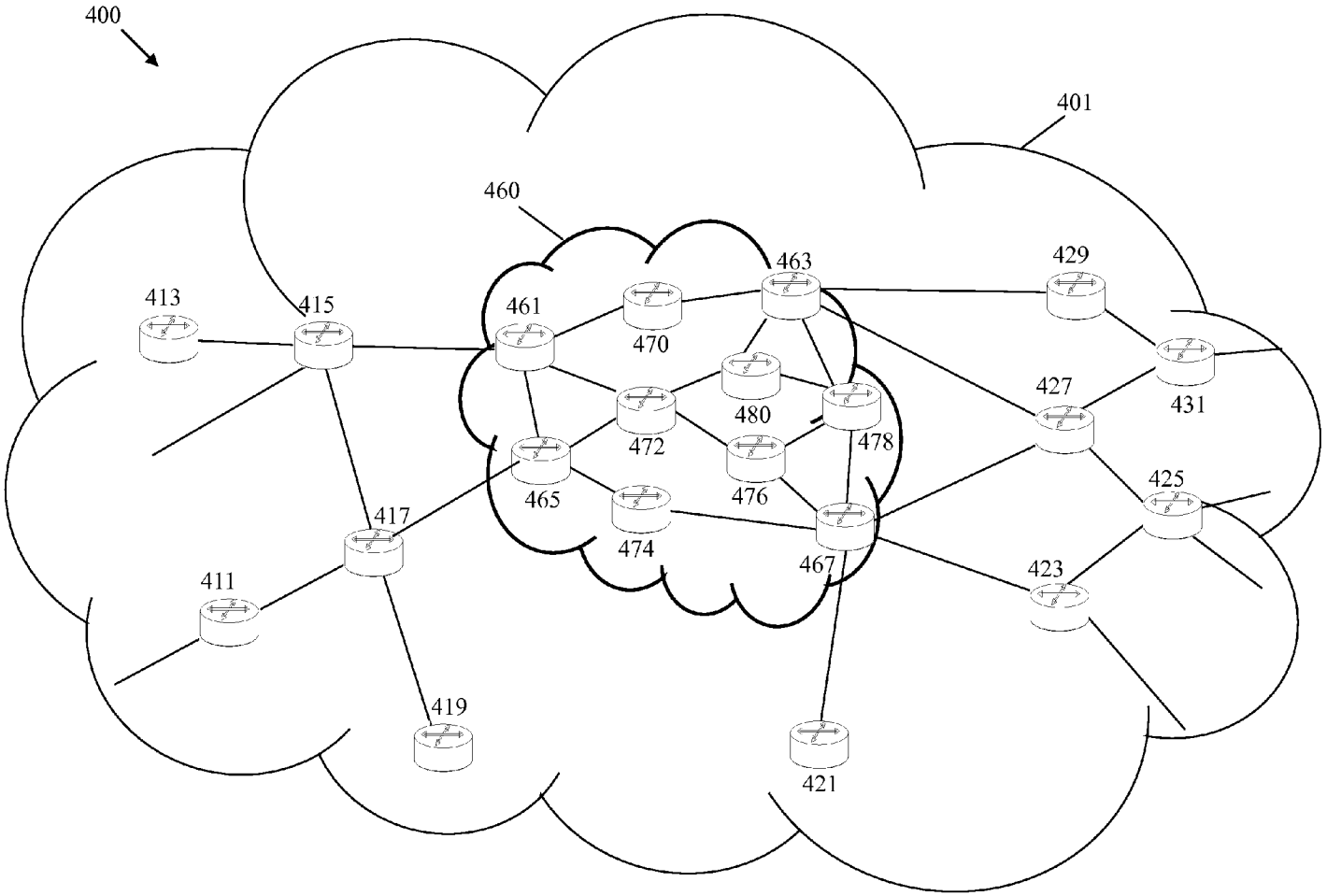
FIGS. 4A and 4B illustrate an embodiment of an AS comprising an area in which a TTZ may be implemented.
Figure 4B:
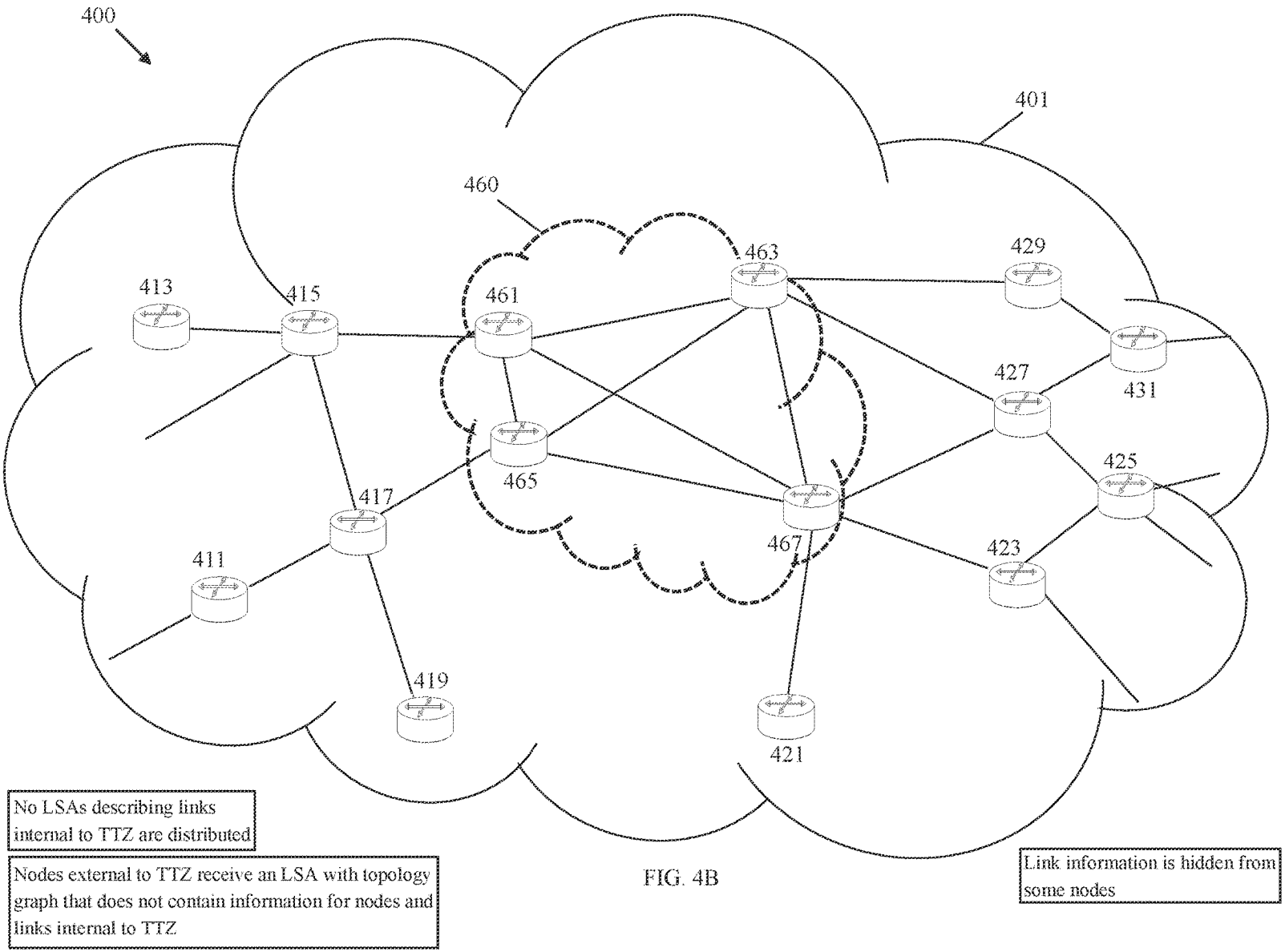

FIGS. 4A and 4B illustrate an embodiment of an AS 400 comprising an area 401 in which embodiments of a TTZ may be implemented. The area 401 may comprise a plurality of nodes 411-431 and a topology transparent zone (TTZ) 460. The nodes 411-431 may be configured similar to the nodes 110-158 in FIG. 1, and may share link state information with one another (as well as with the TTZ 460) via an appropriate IGP (e.g., OSPF, IS-IS, etc.).

The TTZ 460 may comprise a plurality of TTZ nodes including a number of TTZ edge nodes 461, 463, 465 and 467, and a number of TTZ internal nodes 470, 472, 474, 476, 478, and 480. As used herein, both TTZ edge nodes and TTZ internal nodes may be referred to as TTZ nodes. Each of the TTZ edge nodes 461, 463, 465 and 467 may be connected to at least one node outside of the TTZ 460. For instance, the TTZ edge node 461 may be connected to the node 415. The TTZ internal nodes from 470 to 480 may not be directly connected to any node outside of the TTZ 460. For instance, the TTZ internal node 472 is directly connected to TTZ nodes 461, 465, 476, and 480, but not to any node outside the TTZ 460.

Link state information relevant only to the inner-topology of the TTZ 460 (e.g., concerning internal links or adjacencies between pairs of TTZ nodes) may be flooded only within the TTZ 460 (i.e., not distributed to nodes outside the TTZ 460). Information regarding the inner-topology may be stored in topology graphs. Hence, the nodes 411-431 may not receive LSAs describing the TTZ's 460 inner-topology, and as a result may not be able to see or perceive the TTZ's 460 inner-topology. Instead, as shown in FIG. 4B, the TTZ 460 may be transparent or hidden to the nodes 411-431, which view the edge nodes 461, 463, 465 and 467 as normal nodes that are similar to the nodes 411-431. As used herein, a topology graph/table may correspond to any table (e.g., LSDB, RIB, or FIB) used to describe the topology of a corresponding network, AS, area, or TTZ.

The TTZ 460 may be assigned a TTZ identifier (ID), which may be similar to a router ID. The TTZ 460 may be formed after every link inside the TTZ 460 is configured with the same TTZ ID (e.g., the nodes on both sides of each internal link associate the link with the TTZ ID). For instance, as shown in FIG. 4A, there may be a link between edge nodes 461 and 465, a link between edge node 461 and internal node 472, a link between internal nodes 472 and 476, etc. Once the links have been configured with the TTZ ID corresponding to the TTZ 460, then the TTZ's 460 inner-topology may be defined by the TTZ nodes 461-480, as well the links extending between them.

As shown in FIG. 4B, from the perspective of the external nodes 411-431, the TTZ 460 may be "seen" (e.g., viewed, perceived, or otherwise recognized) as a plurality of normal routers, which includes the edge nodes 461, 463, 465, and 467. In an embodiment, each of the edge nodes 461, 463, 465, and 467 may be seen as being directly connected to each of the remaining edge nodes. That is, from the perspective of the external nodes 411-431, the edge nodes 461-467 may be seen as fully connected. Further, each of the edge nodes 461-467 may be directly connected to at least one of the external nodes 411-431. For instance, there may be a link between the edge node 461 and the external node 415.

In an embodiment, each of the edge nodes 461, 463, 465, and 467 may be seen as being directly connected to a pseudo node. That is, from the perspective of the external nodes 411-431, the edge nodes 461-467 may be seen as all connected to the pseudo node. In addition, each of the edge nodes 461-467 may be directly connected to at least one of the external nodes 411-431.

From the perspective of an edge node or router, such as the edge node 461, the edge router may be regarded as connected to each of a plurality of neighboring routers via a link, wherein the plurality of routers comprises a first neighboring router (i.e., an external router) and a second neighboring router (i.e., an internal router). The edge router may comprise a first port configured to connect to the first neighboring router via a first link, and a second port configured to connect to the second neighboring router via a second link. The edge router may further comprise a topology graph/table configured to store information regarding the first and second neighboring routers, and the first and second links. In an embodiment, a topology graph/table stored in the first neighboring router does not contain any information regarding the second neighboring router or the second link, which is an internal link. On the other hand, a topology graph/table stored in the second neighboring router may contain information regarding the first neighboring router and the first link, which is an external link.

Further, the edge router may be configured to generate a first LSA to describe the first link and the second link, and send the first LSA to the second neighboring router. The edge router may be further configured to generate a second LSA to describe the first link and one or more additional links between the edge router and other edge routers of the TTZ 460. Some or all of the additional links may be virtual links, each of which indicates an indirect connection between two edge routers, such as the edge node 461 and the edge node 467 (not directly connected). In one embodiment, a cost of a link between two edge routers may be the cost of the shortest path between the two edge routers. The edge router may be configured to send the second LSA to the first neighboring router. In another embodiment, a forwarding adjacency may be established between every two edge routers (i.e., a pair of edge routers), and a cost of a link between the two edge nodes may be set to a predetermined or fixed value, such as one.

Incorporating a TTZ into an area may help improve availability of the area. Suppose, for example, an internal link between two internal nodes 472 and 480 become broken or faulty. In this case, since external nodes (i.e., outside the TTZ 460) may not have any information regarding the internal nodes 472 and 480, the external nodes may not need to update or recalculate their routing tables (e.g., RIB and/or FIB) due to the broken link between the internal nodes 472 and 480. Instead, only nodes within the TTZ 460 may recalculate their routing tables. As a result, the scale of routing table recalculation may become smaller. Although a broken link is described as an example, it should be noted that a broken internal node (e.g., the node 472) may also only lead to updating of routing tables within the TTZ 460.

One application of the TTZ techniques described herein may be to configure a point-of-presence (POP) (e.g., a floor or a room of routers) as a TTZ, in which case the entire POP may behave as a plurality of edge routers (i.e., the internal routers/links in the POP are hidden from external nodes). As is the case with other implementations, the TTZ approach described herein may allow for greater scalability (e.g., backbone/non-backbone areas and TTZ as opposed to just backbone/non-backbone areas), simpler computation/establishment of LSPs, faster routing re-convergence (e.g., after a fault or a broken link or node), improved performance, and higher availability in POP applications.

Figure 5:
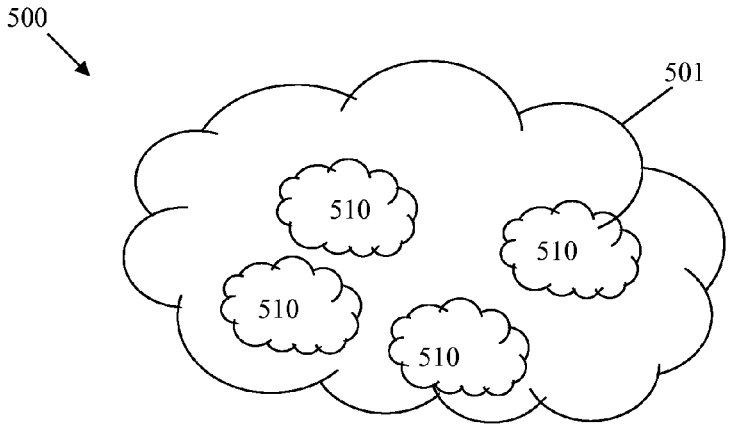
FIG. 5 illustrates an embodiment of an AS comprising a single area in which a plurality of TTZs may be established.

FIG. 5 illustrates an embodiment of an AS 500 comprising a single area 501, in which a plurality of TTZs 510 may be established. Each of the TTZs 510 may be configured similarly to the TTZ 460 in FIG. 4. Although four TTZs 510 are shown in the area 501 as an illustrative example, any other number of TTZs may be established. Each TTZ 510 in the area 501 may have any appropriate number of edge routers and/or internal routers, and its inner-topology may be configured flexibly.

Figure 6:
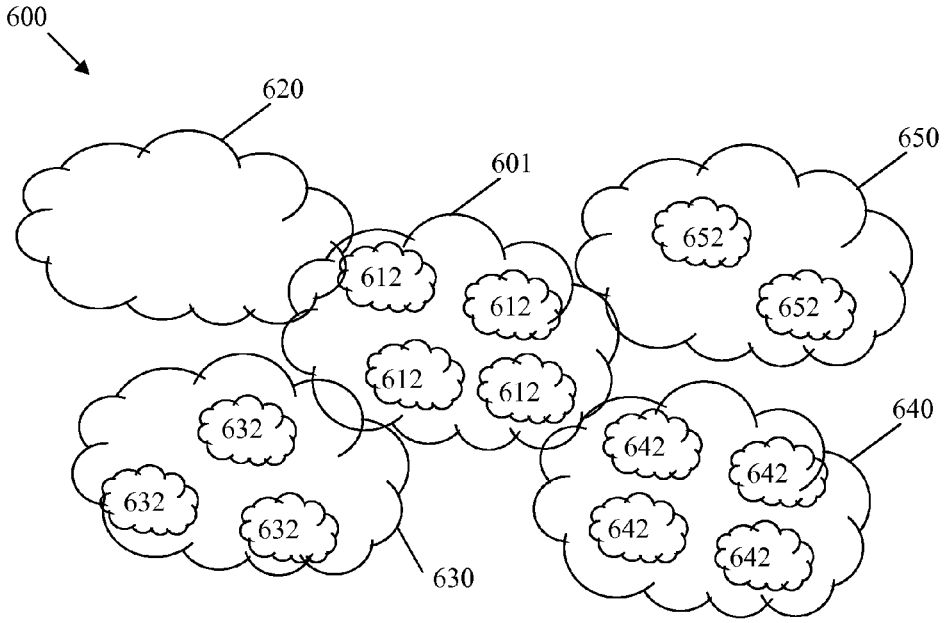
FIG. 6 illustrates an embodiment of an AS comprising a plurality of areas, in each of which one or more TTZs may be established.

FIG. 6 illustrates an embodiment of an AS 600 comprising a plurality of areas 601, 620, 630, 640, and 650. The area 601 may be configured as a backbone area being coupled with all other non-backbone areas 620, 630, 640, and 650. In at least one of the plurality of areas 601, 620, 630, 640, and 650, one or more TTZs may be established. For example, as shown in FIG. 6, the area 601 may contain four TTZs 612, the area 620 may not contain any TTZ, the area 630 may contain three TTZs 632, the area 640 may contain four TTZs 642, and the area 650 may contain two TTZs 652. Each of the shown TTZs may be configured similarly to the TTZ 460 in FIG. 4. For example, each TTZ in the AS 600 may have any appropriate number of edge routers and/or internal routers, and its inner-topology may be configured flexibly.

Figure 7A:
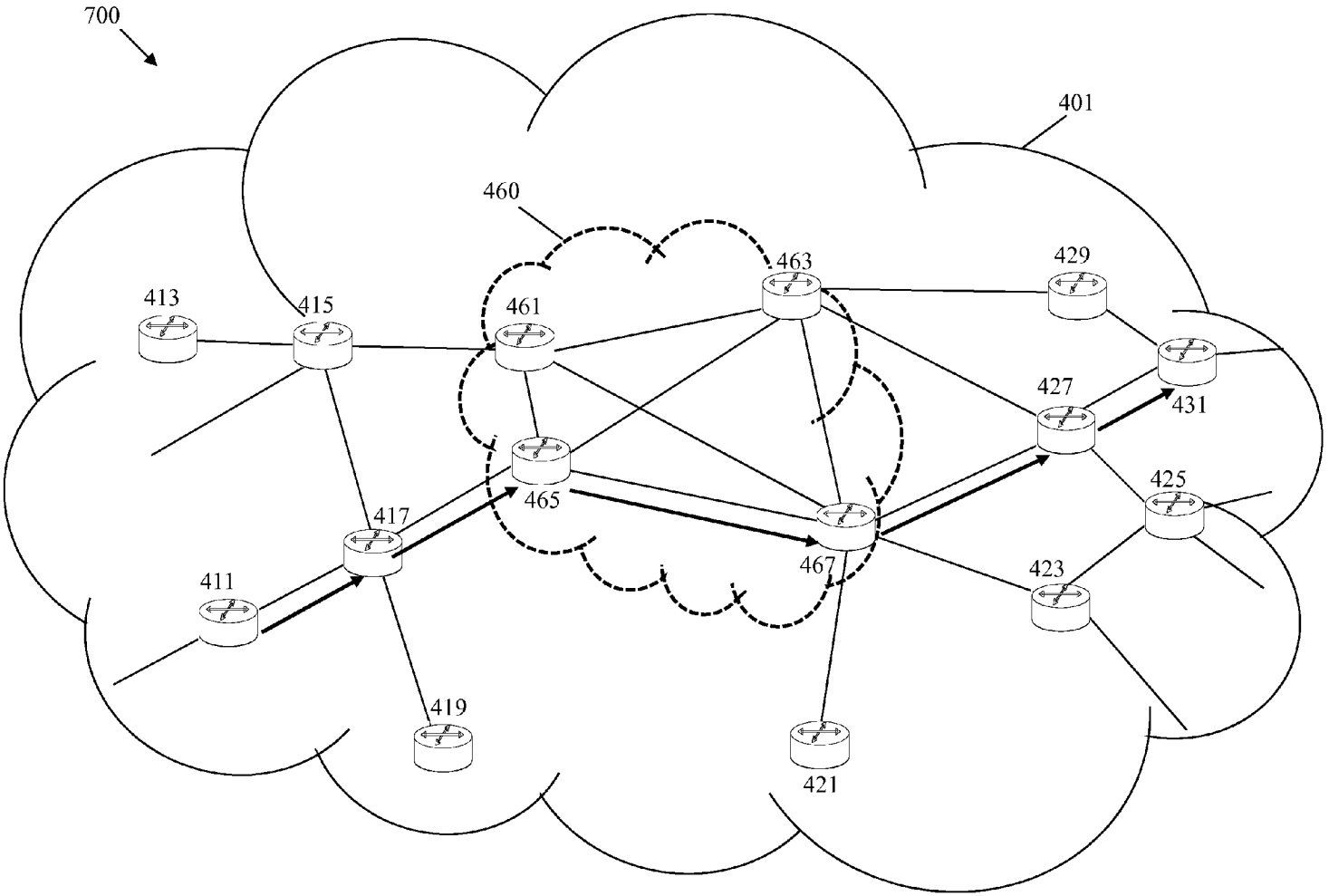
FIGS. 7A and 7B illustrate an exemplary scheme of setting up a LSP in an area.
Figure 7B:
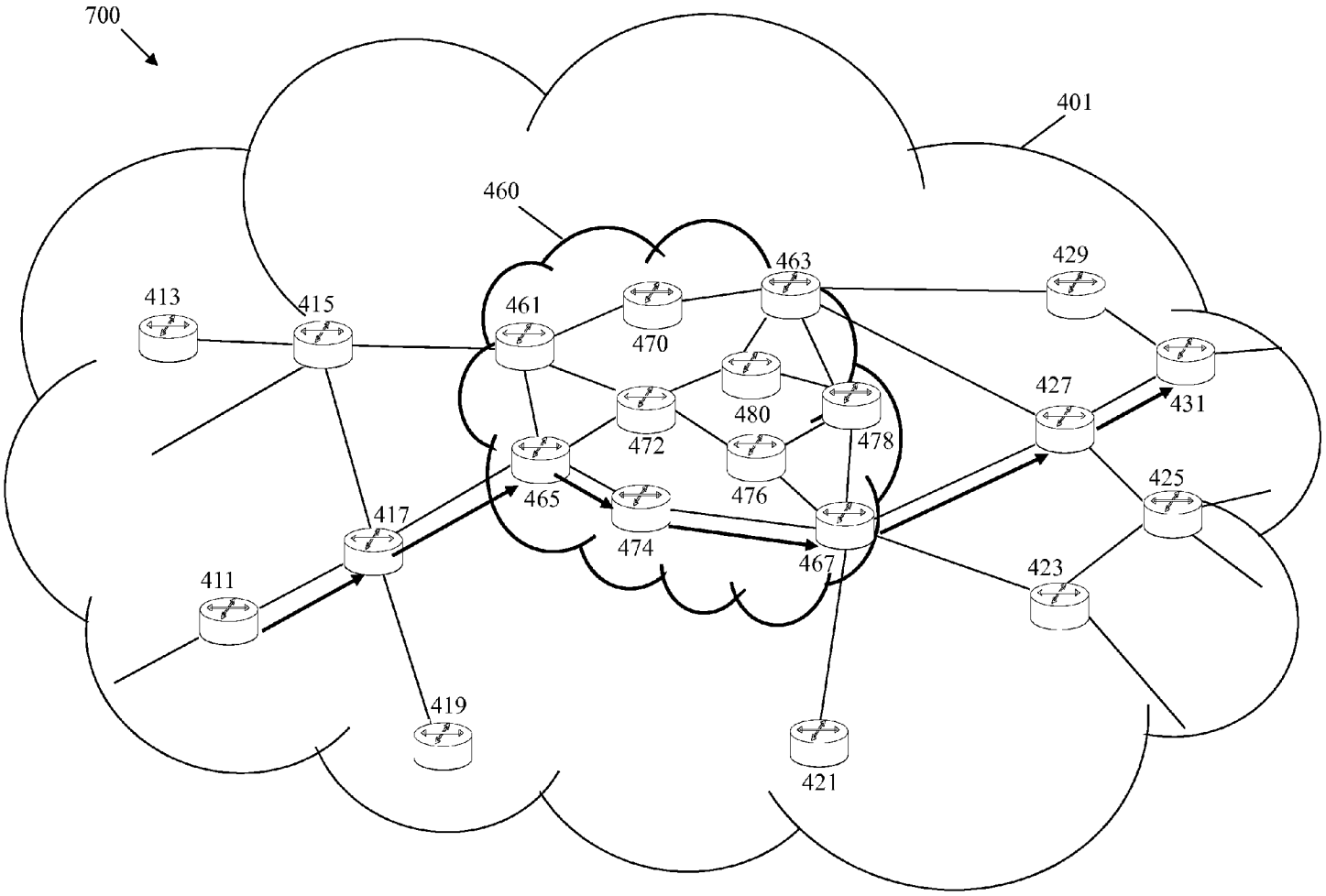

In an area comprising one or more disclosed TTZs, conventional functionalities such as end-to-end traffic engineering (TE) label switched path (LSP) may be setup without any added complexity. FIGS. 7A and 7B illustrate an exemplary scheme 700 of setting up a LSP in the area 401 (previously described in FIG. 4). FIG. 7A represents the architecture of the TTZ 460 as seen by external node 411-431, whereas FIG. 7B represents the architecture of the TTZ 460 as seen by the TTZ node 460-480. In the exemplary scheme 700, the LSP is computed from the node 411 to the node 431 (note that other LSPs in the area 401 may be similarly set up). Since the nodes 411 and 431 are located outside the TTZ 460, they may not be aware of the presence of the TTZ 460. Instead, the nodes 411 and 431 perceive the edge nodes 461, 463, 465, and 467 as normal routers that are no different from themselves. As shown in FIG. 7A, in connecting the nodes 411 and 431, the LSP may first route from node 411 to node 417, then to node 465, then to node 467, then to node 427, and then to node 431. Since the edge nodes 465 and 467 may not be directly connected via an internal link (as seen by the node 411) within the TTZ 460, when a signaling protocol, such as a resource reservation protocol—traffic engineering (RSVP-TE) path message arrives at the node 465 from the node 411 through 417, the node 465 may compute or determine a path segment for the LSP to the node 467, e.g., via the internal node 474. Thus, the LSP may be set up in a normal way as if the TTZ 460 is not present.

Figure 8A:
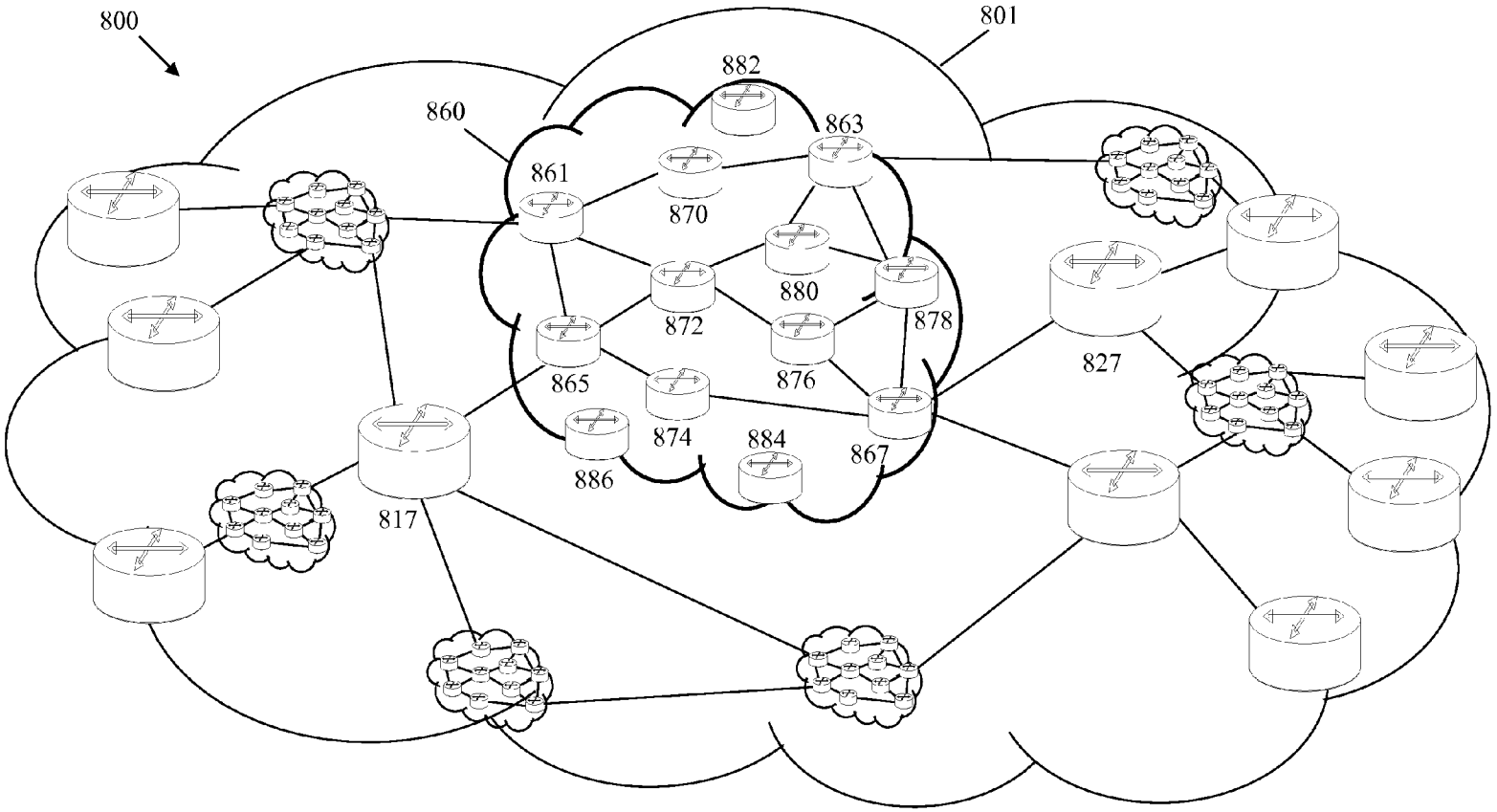
FIGS. 8A and 8B illustrate an embodiment of an AS comprising an area, which includes a relatively large number of nodes.
Figure 8B:
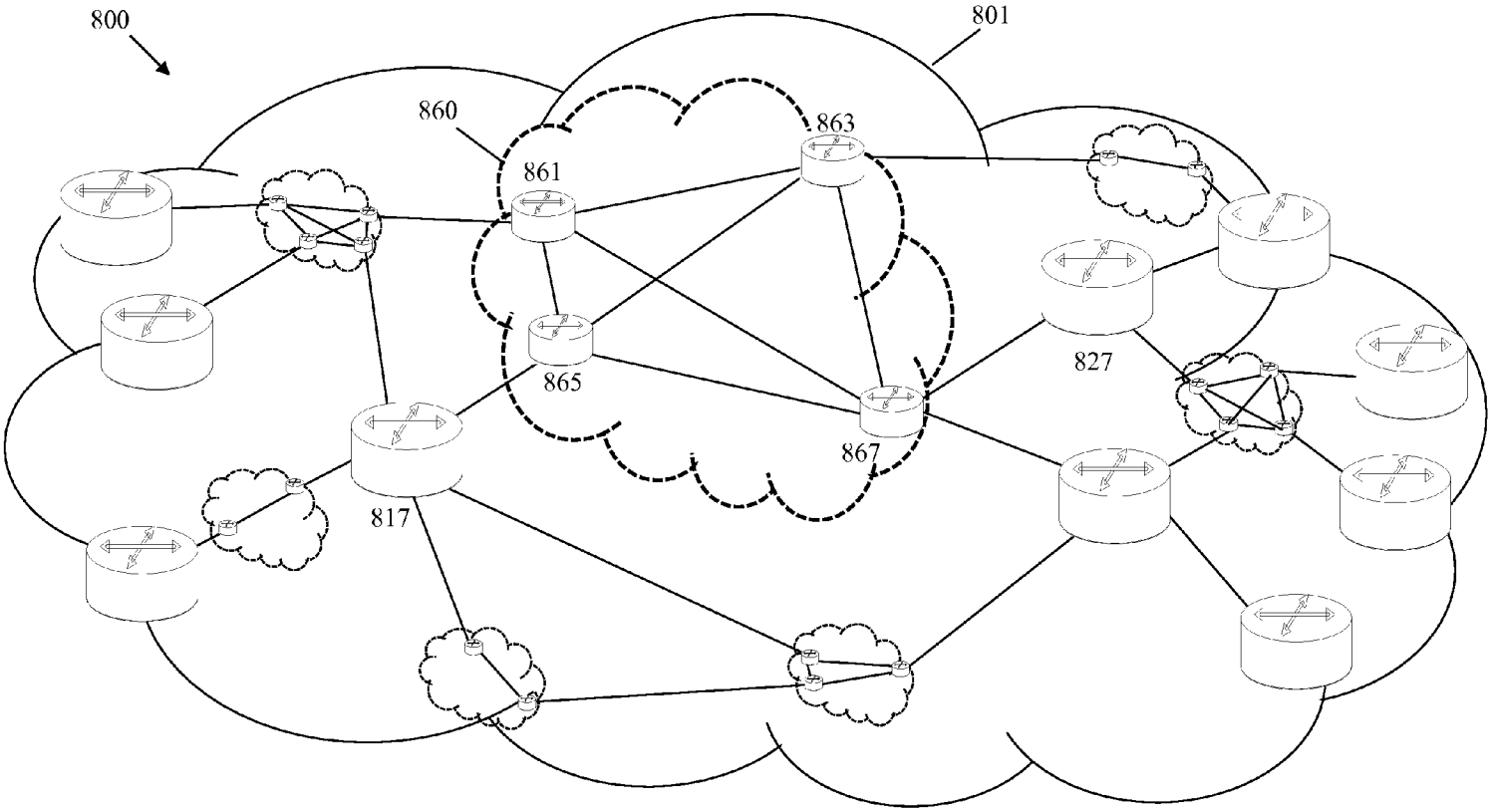

As mentioned previously, in a conventional network, as the number of nodes in an area continuous to grow (e.g., as illustrated in FIG. 2), the area may need to be divided into multiple areas, which may lead to structural change of the network and interruption of service. The introduction of one or more disclosed TTZs may help prevent division of one area into multiple areas. FIGS. 8A and 8B illustrate an embodiment of an AS 800 comprising an area 801, which includes a relatively large number of nodes. As shown in FIG. 8A, part of the nodes in the area 801 are configured into a plurality of TTZs including a TTZ 860, while other nodes remain as external nodes. The TTZ 860 may be configured similar to the TTZ 460 as described above. For example, the TTZ 860 may comprise a plurality of TTZ nodes including a number of TTZ edge nodes 861, 863, 865 and 867, and a number of TTZ internal nodes 870, 872, 874, 876, 878, 880, 882, 884, and 886. Internal links may be formed to connect some or all of the nodes in the TTZ 860. Although FIG. 8A shows each TTZ with a similar inner-topology, it should be understood that each TTZ may have any inner-topology, e.g., any number of nodes and any internal link structures.

In practice, each node in the area 801 may build or compute a shortest path first (SPF) tree using topology it sees or perceives. From the perspective of an external node (e.g., the node 817), each of the plurality of TTZs (e.g., the TTZ 860) may simply behave as a collection of normal nodes (e.g., the nodes 861-867), as shown in FIG. 8B. Since internal nodes and internal links are eliminated from the topology graphs/tables stored in each external nodes, these internal nodes and internal links may be virtually non-existent to the external nodes. In addition, an internal or edge node located in one TTZ may not be aware of an internal node located in a different TTZ. As a result, the number of nodes/links that need to be stored in each node in the area 801 may be reduced. Effectively, from routing point of view, the number of nodes in the 801 may be reduced. Thus, despite possibly having a large number of nodes, the area 801 may remain as a single area instead of being divided into smaller areas (as shown in FIG. 2). Since no inter-area communication is needed, architectural change in the AS 800 may be reduced (e.g., no need to separately define backbone area and non-backbone areas), which leads to faster convergence and a more stable network. Further, functionalities such as end-to-end TE LSP across multiple TTZs may still be set up readily.

Figure 9:
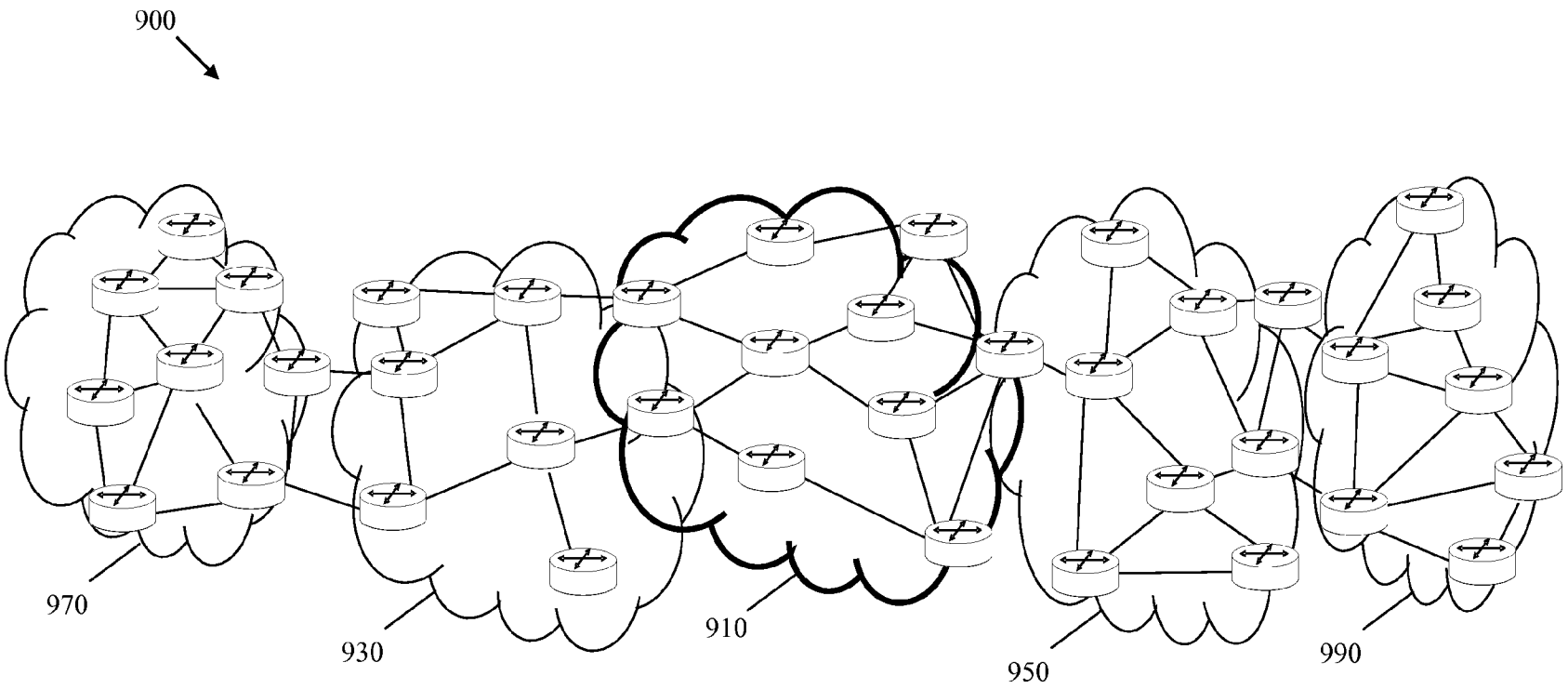
FIG. 9 illustrates an AS comprising a plurality of areas as well as a plurality of TTZs.

Similarly, the incorporation of one or more TTZs may also help avoid separation of one AS into multiple ASs. FIG. 9 illustrates an AS 900 comprising a plurality of areas 910, 930, and 950, as well as a plurality of TTZs 970 and 990. Compared with a conventional AS, such as the AS 300 described in FIG. 3B, the AS 900 may comprise an equally large or larger number of nodes without needing to be separated into multiple ASs. Instead, nodes added into the AS 900 may simply be configured into TTZs. As described previously, only edge nodes are visible to external nodes, thus the number of added nodes into the AS may be increased. The capability to maintain a single AS 900 may lead to various benefits. For example, major network architectural change and service interruption, which may occur during the AS splitting process, is avoided. Further, it may be relatively easier to operate and manage a network with a single AS than a network with multiple ASs. It may be relatively easier for applications/software to be aware of drive and/or control schemes within a single AS. Moreover, services such as inter-cloud networking may be made easier.

Figure 10:
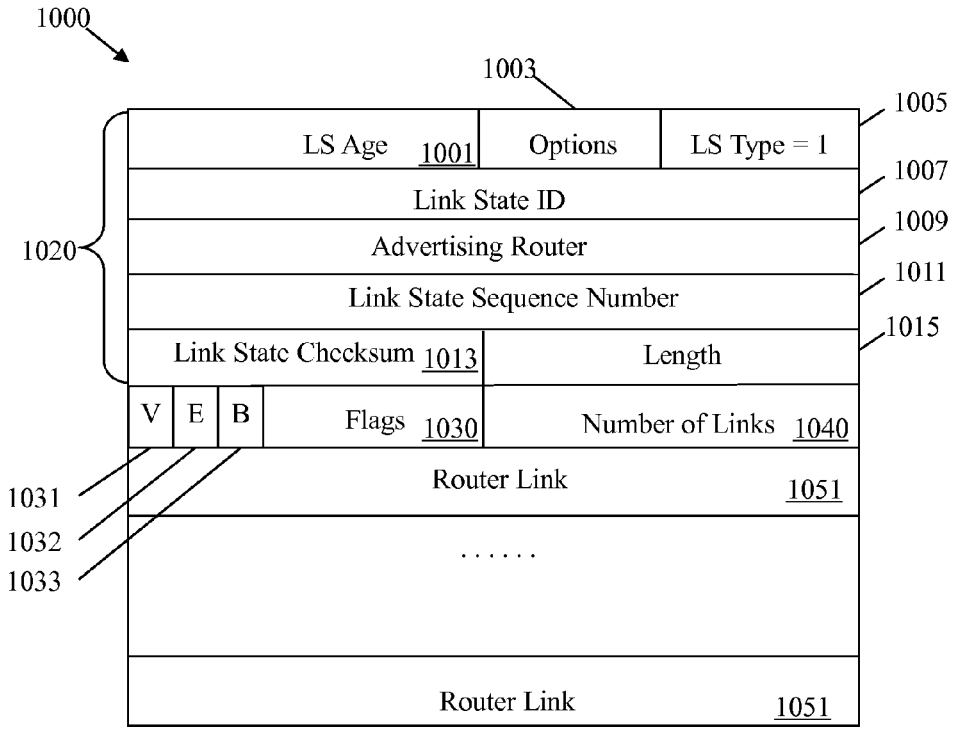
FIG. 10 illustrates an embodiment of a node or router LSA.

FIG. 10 illustrates an embodiment of a node or router LSA 1000 comprising a LSA header field 1020, a Flags field 1030, a Number of Links field 1040, and a plurality of Router Link fields 1051. The LSA header field 1020 may include a link state (LS) Age field 1001, an Options field 1003, a LS-Type field 1005, a Link State ID field 1007, an Advertising Router field 1009, a Link state Sequence Number field 1011, a Link State Checksum field 1013, and a Length field 1015. In an embodiment, the LS Type field 1005 may be set to a predetermined value (e.g., one) to indicate that the LSA 1000 is a router LSA.

The Flags 1030 may indicate the characteristics of a router that originates the LSA 1000, and may comprise a virtual link (V) bit 1031, an External (E) bit 1032, and a Border (B) bit 1033. The V bit 1031 may be set to a predetermined value (e.g., one) to indicate that the source router is an endpoint of one or more fully adjacent virtual links. The E bit 1032 may be set to a predetermined value (e.g., one) to indicate that the source router is an AS boundary router. The B bit 1033 may be set to a predetermined value (e.g., one) to indicate that the source router is an ABR. The Number of Links field 1040 may be a 16-bit number and may indicate the number of router links that are described in the Router Links fields 1051. The Router Links fields 1051 may comprise a Router Link field for each of the router links in the source router's area (e.g., the TTZ). Each Router Link field 1051 may describe an individual router link in the TTZ.

Figure 11:
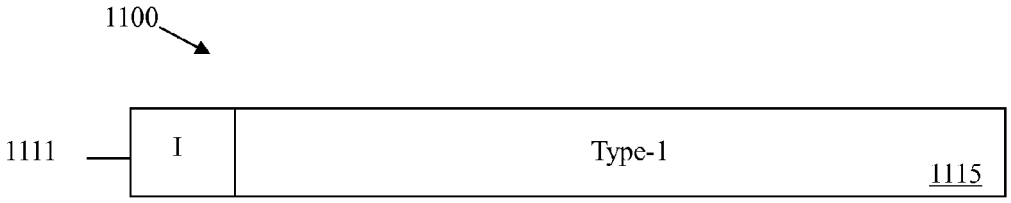
FIG. 11 illustrates an embodiment of a link type.

FIG. 11 illustrates an embodiment of a link type 1100, which may be incorporated into a Router Link field 1051. The link type 1100 comprises a bit flag 1111 (denoted as an I bit flag) and a Type-1 field 1115. The link type 1100 may be an 8-bit octet, with the I bit flag 1111 occupying one bit and the Type-1 field 1115 occupying 7 bits. The I bit flag 1111 may indicate whether the link is an internal link (i.e., a link inside a TTZ) or an external link (i.e., a link outside the TTZ), and the Type-1 field 1115 may be set to predetermined values, such as one, two, three, or four, to indicate that the kind of link being described is a point-to-point (P2P) connection to another router, a connection to a transit network, a connection to a stub network, or a virtual link (respectively).

In an embodiment, the I bit flag 1111 may be set to about one to indicate that the link is an internal link in a TTZ, or to about zero to indicate that the link is an external link. Consequently (in such an embodiment), the link type 1100 may have the same value as a conventional link type, e.g., when the link is an external link (i.e., a link outside the TTZ) and the I bit flag field 1111 is set to zero. Additionally, the link type 1100 may have a value that is one bit different from the conventional link type, e.g., when the link is an internal link (i.e., a link inside the TTZ) and the value of the I bit flag field 1111 is set to one.

In an alternative embodiment, the I bit flag 1111 may be set to about zero to indicate that the link is an internal link in a TTZ, or to about one to indicate that the link is an external link. Consequently (in such an embodiment), the link type 1100 may have the same value as a conventional link type when the link is an internal link, or a value that is one bit different from the conventional link type when the link is an external link. As a further alternative, a new field for a TTZ ID may be added into a router link to indicate which TTZ the link belongs to. The new field may be set to about zero to indicate that the corresponding link is a link connecting to a node outside of the TTZ, or to a non-zero value (e.g., a TTZ ID corresponding to a TTZ) to indicate that the link belongs to which TTZ.

FIGS. 12A-12C illustrate examples of router LSAs (with the format of the router LSA 1000) generated by different nodes or routers. In an embodiment, a router LSA 1210, as shown in FIG. 12A, may be generated by an edge node (the edge node 461 in FIG. 4A in this example for illustration) and distributed within a TTZ itself (e.g., the TTZ 460). In the router LSA 1210, the Link State ID and the Advertising Router fields may be used to identify the edge node 461, wherein the router LSA is generated. Since the edge node 461 is connected to the external node 415 via an external link, to the edge node 465 via an internal link, to the internal node 470 via another internal link, and to the internal node 472 via yet another internal link, four Router Link fields may be used to indicate all links associated with the edge node 461. Further, in the Router Link fields, the I bit flag may be set to one if the link is internal, or otherwise set to zero if the link is external. After the router LSA 1210 is generated, it may be distributed or flooded to every other node in the TTZ 460 but not to any node outside of the TTZ 460.

In an embodiment, another router LSA 1230, as shown in FIG. 12B, may be generated by the edge node 461, which may then be distributed to external routers. In the router LSA 1230, the Link State ID and the Advertising Router fields may be used to identify the edge node 461. From the perspective of an external node, the edge node 461 may be connected to nodes 415, 463, 465, and 467 via normal links (as shown in FIG. 4B). Note that some links between the edge nodes (e.g., between nodes 461 and 467) may be virtual links. Accordingly, four Router Link fields may be used to indicate all links associated with the edge node 461. Further, in all the Router Link fields, the I bit flag may be set to zero. After the router LSA 1230 is generated, it may be flooded to all external nodes in the area 401.

In an embodiment, yet another router LSA 1250, as shown in FIG. 12C, may be generated by an internal node (the internal node 472 in this example for illustration) and flooded to the TTZ 460 itself. In the router LSA 1250, the Link State ID and the Advertising Router fields may be used to identify the internal node 472. Since the internal node 472 is connected to the internal nodes 476 and 480, and the edge nodes 461 and 465 via four internal links, four Router Link fields may be used to indicate all internal links associated with the internal node 472. Further, in the Router Link fields, the I bit flag may be set to one. After the router LSA 1250 is generated, it may be distributed or flooded to every other node in the TTZ 460 but not to any node outside of the TTZ 460.

Figure 13:
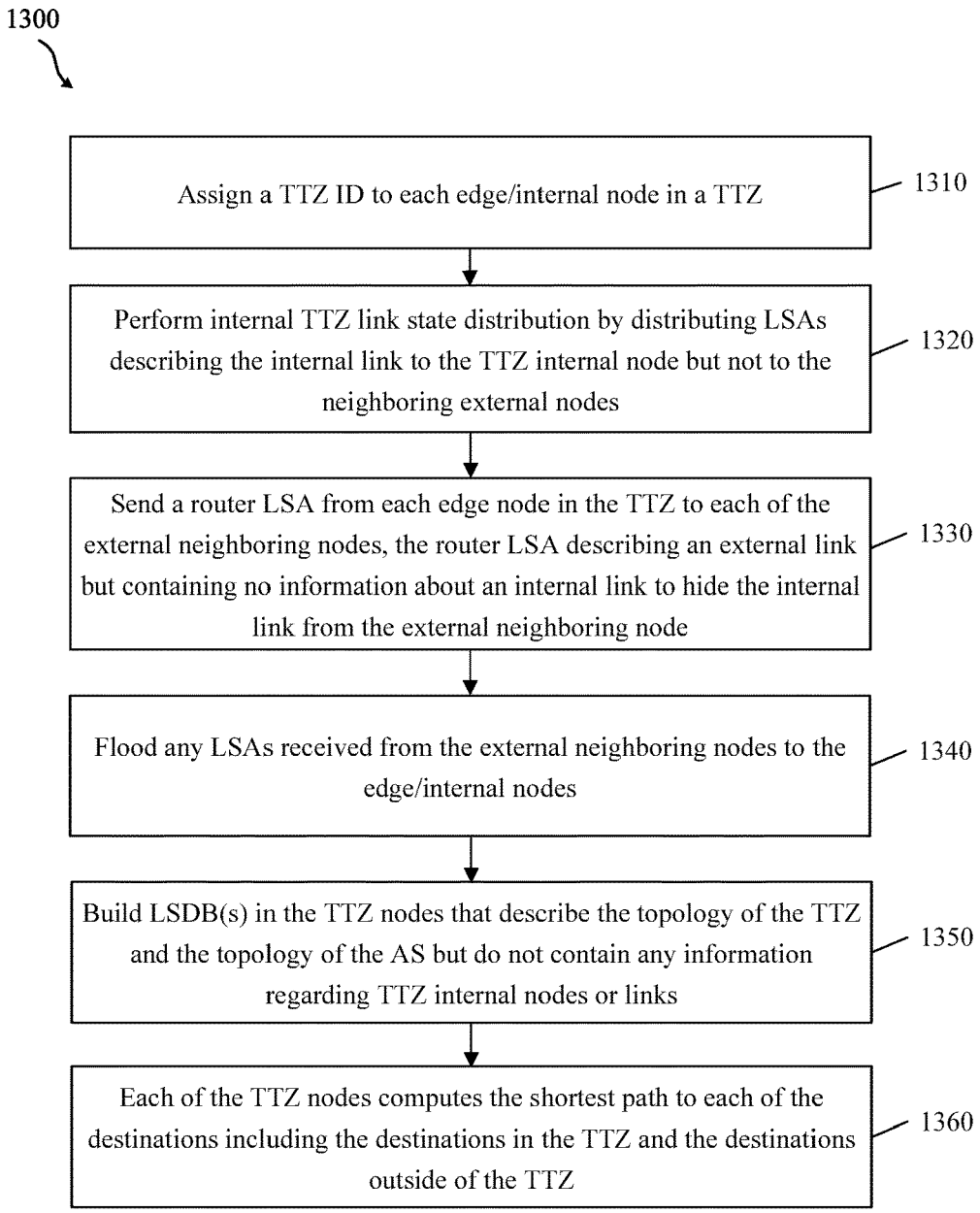

FIG. 13 illustrates an embodiment of a method 1300 for configuring a disclosed TTZ in an AS. The method 1300 may begin in step 1310, where a TTZ ID may be assigned to each node in the TTZ. In some embodiments, the TTZ edge nodes and/or internal nodes may perform an intermediate step of exchanging hello packets with TTZ IDs to establish their own adjacencies after the step 1310. The method 1300 may then proceed to step 1320, where an internal TTZ link state distribution may be performed. Specifically, the internal TTZ link state distribution may comprise constructing and flooding LSAs describing each TTZ node's adjacencies to all of the TTZ nodes and to all of the neighboring external nodes. Appropriate I bit flags (e.g., set to one for internal links, and zero for external links) may be assigned to each LSA. The TTZ edge nodes may include descriptions of their external links (i.e., links between the TTZ edge node and an external node) in the LSAs they construct, thereby allowing the other TTZ edge nodes (as well as the TTZ internal nodes) to develop a topological understanding of the external nodes/links. As a result of the internal TTZ link state distribution, every TTZ node may derive a topological understanding of the TTZ's inner-topology (i.e., the positional relationship of the TTZ nodes with respect to one another including the internal links) as well as an understanding of the TTZ's adjacencies (i.e., the positional relationship of the TTZ edge nodes to their neighboring external nodes including identification of the external links).

Next, the method 1300 may proceed to step 1330, where each TTZ edge node may independently construct a router LSA describing each of the external links, and distribute the router LSA to the neighboring external nodes to which it is interconnected. The router LSA may specify a router ID of the originating router. Next, the method 1300 may proceed to step 1340, where the TTZ edge nodes may flood any LSAs received from the neighboring external nodes throughout the TTZ, thereby allowing the TTZ nodes to develop a topological understanding of the AS topology. In some embodiments, the TTZ edge nodes may also distribute LSA received from neighboring external nodes to other neighboring external nodes as may be consistent with the IGP implemented in the AS. Although FIG. 13 describes the TTZ edge nodes as receiving LSAs describing the AS topology as occurring after the steps 1310-1330, those of ordinary skill in the art will recognize that such LSAs may be received intermittently during the performance of the method 1300.

Next, the method 1300 may proceed to step 1350, where LSDBs describing the TTZ's inner-topology and the AS topology may be built in each of the TTZ nodes, thereby allowing the TTZ nodes to develop a topological understanding of the both TTZ's inner-topology and the AS topology. Finally, the method may proceed to step 1360, where each of the TTZ nodes computes the shortest path to each of the destinations, which include destinations in the TTZ and destinations outside of the TTZ.

Figure 14:
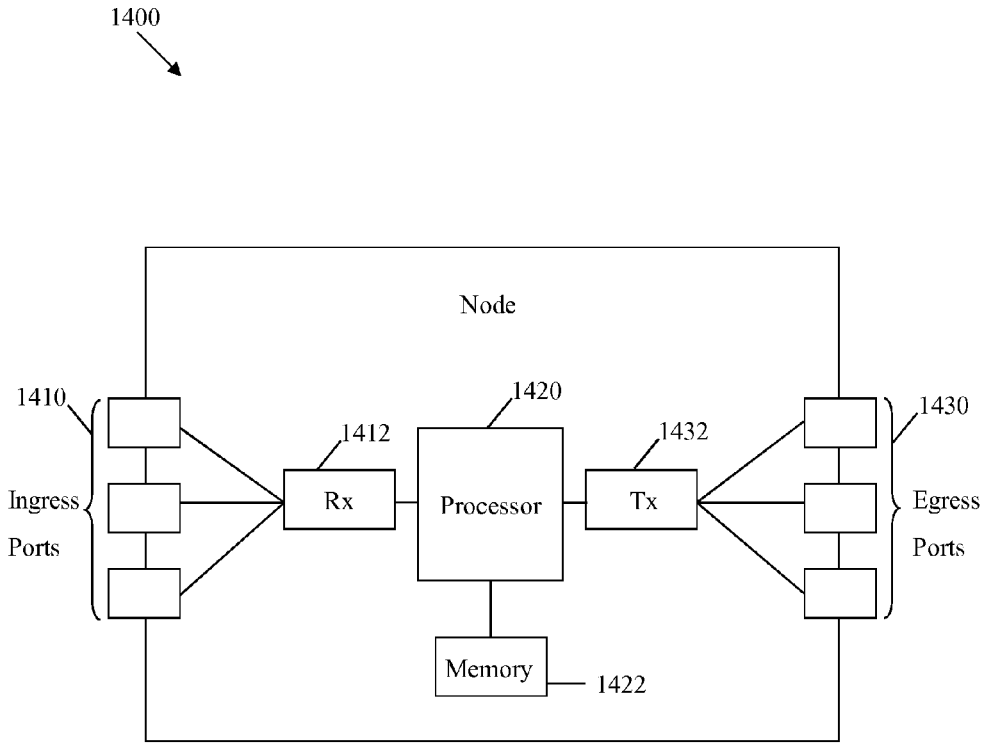
FIG. 14 illustrates an embodiment of a node.

FIG. 14 illustrates an embodiment of a node or a router 1400, as described above within a network or system. The node 1400 may comprise a plurality of ingress ports 1410 and/or receiver units (Rx) 1412 for receiving data from other nodes, a processor 1420 to process data and determine which node to send the data to, a memory 1422, and a plurality of egress ports 1430 and/or transmitter units (Tx) 1432 for transmitting data to the other nodes. Although illustrated as a single processor, the processor 1420 is not so limited and may comprise multiple processors. The processor 1420 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1420 may be configured to implement any of the schemes described herein, such as the method 1300. The processor 1420 may be implemented using hardware, software, or both. The memory 1422 may be configured to store routing tables, forwarding tables, or other tables or information disclosed herein. Although illustrated as a single memory, memory 1422 may be implemented as a combination of read only memory (ROM), random access memory (RAM), or secondary storage (e.g., one or more disk drives or tape drives used for non-volatile storage of data).

Figure 15:
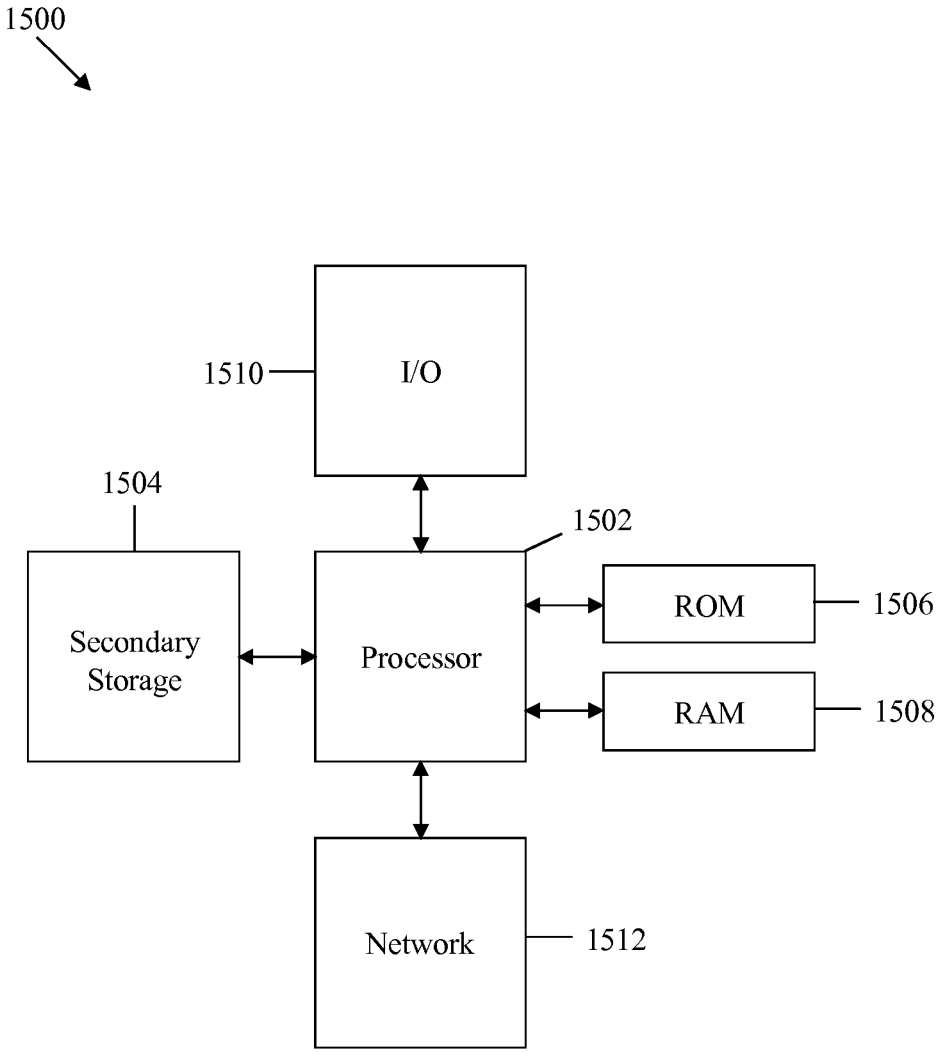
FIG. 15 illustrates an embodiment of a general-purpose node or router.

The schemes described above may be implemented on any general-purpose network component, such as a computer or network component with sufficient processing power, memory resources, and network throughput capability to handle the necessary workload placed upon it. FIG. 15 illustrates a schematic diagram of a general-purpose node or router 1500 suitable for implementing one or more embodiments of the methods disclosed herein, such as the method 1300. The general-purpose network component or computer system 1500 includes a processor 1502 (which may be referred to as a central processor unit or CPU) that is in communication with memory devices including secondary storage 1504, ROM 1506, RAM 1508, input/output (I/O) devices 1510, and network connectivity devices 1512. Although illustrated as a single processor, the processor 1502 is not so limited and may comprise multiple processors. The processor 1502 may be implemented as one or more CPU chips, cores (e.g., a multi-core processor), FPGAs, ASICs, and/or DSPs, and/or may be part of one or more ASICs. The processor 1502 may be configured to implement any of the schemes described herein, including the method 1300. The processor 1502 may be implemented using hardware, software, or both.

The secondary storage 1504 is typically comprised of one or more disk drives or tape drives and is used for non-volatile storage of data and as an over-flow data storage device if the RAM 1508 is not large enough to hold all working data. The secondary storage 1504 may be used to store programs that are loaded into the RAM 1508 when such programs are selected for execution. The ROM 1506 is used to store instructions and perhaps data that are read during program execution. The ROM 1506 is a non-volatile memory device that typically has a small memory capacity relative to the larger memory capacity of the secondary storage 1504. The RAM 1508 is used to store volatile data and perhaps to store instructions. Access to both the ROM 1506 and the RAM 1508 is typically faster than to the secondary storage 1504. At least one of the secondary storage 1504 or RAM 1508 may be configured to store routing tables, forwarding tables, or other tables or information disclosed herein.

It is understood that by programming and/or loading executable instructions onto the node 1400, at least one of the processor 1420 or the memory 1422 are changed, transforming the node 1400 in part into a particular machine or apparatus, e.g., a router, having the novel functionality taught by the present disclosure. Similarly, it is understood that by programming and/or loading executable instructions onto the node 1500, at least one of the processor 1502, the ROM 1506, and the RAM 1508 are changed, transforming the node 1500 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An autonomous system (AS) comprising:

a topology transparent zone (TTZ) comprising a plurality of TTZ nodes, wherein the plurality of TTZ nodes comprises [an] *a TTZ* edge node and [an] *a TTZ* internal node, wherein [each of] the [plurality of] TTZ [nodes] *edge node* is configured to connect to [another] *the* TTZ *internal* node via an internal link; and a plurality of neighboring external nodes connected to the TTZ edge [nodes] *node* via a plurality of external links, wherein [no] *the TTZ edge node is configured to distribute* link state advertisements (LSAs) describing the internal [links are distributed] *link to the TTZ internal node but not* to the neighboring external nodes, wherein *the TTZ edge node is configured to distribute* a plurality of *first* LSAs describing the plurality of external links [are distributed] to the plurality of neighboring external nodes, wherein the *TTZ edge node is configured to distribute a plurality of second* LSAs describing the plurality of external links and the [plurality of] internal [links are distributed] *link* to each of the plurality of TTZ nodes, and wherein each of the *second* LSAs comprises:

a LSA header comprising a link state type field [specifying a router LSA type]; and a number of router link fields, wherein each router link field comprises a bit flag, denoted as an I bit flag, to indicate whether a link is external or internal with respect to the TTZ.

2. The AS of claim 1, wherein the plurality of TTZ nodes comprises at least two *TTZ* edge nodes including the *TTZ* edge node, wherein the plurality of neighboring external nodes perceives the at least two *TTZ* edge nodes as fully connected.

3. The AS of claim 2, wherein a cost of [an internal] *a* link between two *TTZ* edge nodes *in the AS* is a cost of a shortest path between the two *TTZ* edge nodes.

4. The AS of claim 2, wherein a cost of [an internal] *a* link between two *TTZ* edge nodes *in the AS* is a predetermined value.

5. The AS of claim 1, wherein a positional relationship between any two of the TTZ nodes defines an inner-topology of the TTZ, and wherein no information regarding the inner-topology is distributed to or stored in any of the plurality of neighboring external nodes.

6. The AS of claim 1, wherein [an] *the* I bit flag [of] *is set to* one [indicates] *to indicate* an internal link, and wherein [an] *the* I bit flag [of] *is set to* zero [indicates] *to indicate* an external link.

7. The AS of claim 1, wherein [an] *the* I bit flag [of] *is set to* zero [indicates] *to indicate* an internal link, and wherein [an] *the* I bit flag [of] *is set to* one [indicates] *to indicate* an external link.

8. The AS of claim 1, wherein the [area] *AS* further comprises a second TTZ comprising a second plurality of TTZ nodes, wherein the second plurality of TTZ nodes includes at least two additional *TTZ* edge nodes and at least one additional *TTZ* internal node, wherein each of the second plurality of TTZ nodes is configured to connect to another node of the second plurality of TTZ nodes via an internal link of the second TTZ[, and wherein the at least two additional edge nodes are configured to receive information regarding the at least two edge nodes].

9. A method of configuring a topology transparent zone (TTZ) [in an area] of an autonomous system (AS), the method comprising:

assigning a *same* TTZ identifier (ID) to [a plurality of] *all* internal links that interconnect a plurality of TTZ nodes located within the TTZ, wherein each of the plurality of internal links interconnects a pair of the plurality of TTZ nodes, wherein the plurality of TTZ nodes includes at least one edge node and at least one internal node;

sending a link state advertisement (LSA) from each of the at least one edge node via a plurality of external links to each of a plurality of neighboring external nodes [located in the area] *within the AS, wherein each LSA comprises a LSA header containing a link state type field specifying a router LSA type and a number of router link fields, wherein each router link field comprises a bit flag, denoted as an I bit flag, to indicate whether a link is external or internal with respect to the TTZ, and* wherein each neighboring external node is connected to at least one of the edge nodes via at least one of the external links; and updating topology graphs in the neighboring external nodes based on each LSA, wherein the topology graphs describe the TTZ as the at least one edge router, and wherein the topology graphs do not contain any information regarding the at least one internal node or the plurality of internal links[, wherein each LSA comprises:

a LSA header comprising a link state type field specifying a router LSA type; and a number of router link fields, wherein each router link field comprises a bit flag, denoted as an I bit flag, to indicate whether a link is external or internal with respect to the TTZ].

10. The method of claim 9, wherein the plurality of TTZ nodes comprises at least two edge nodes, wherein the topology graphs describe the at least two edge routers as fully connected.

11. The method of claim 9, further comprising distributing LSAs describing an inner-topology of the TTZ over the internal links, wherein no link state information describing the inner-topology of the TTZ is distributed over the external links.

12. The method of claim 9, wherein [an] *the* I bit flag [of] *is set to* one [indicates] *to indicate* an internal link, and wherein [an] *the* I bit flag [of] *is set to* zero [indicates] *to indicate* an external link.

13. A [router used in an area] *network node within a topology transparent zone* (*TTZ*) of an autonomous system (AS) comprising:

a first port configured to connect to a first neighboring [router] *network node* via a first link;

a second port configured to connect to a second neighboring [router] *network node* via a second link;

a memory configured to store a topology graph comprising information regarding the first and second neighboring [routers,] *network nodes* and the first and second links, wherein the [router] *network node*, the first neighboring [router] *network node*, and the second neighboring [router] *network node* are located within the [area] *AS, and*

[wherein the first neighboring router does not contain any information regarding the second neighboring router or the second link, and wherein the second neighboring router contains information regarding the first neighboring router and the first link; and]

a processor configured to:

generate a first link state advertisement (LSA) [comprising] *describing* the first and second links;

send the first LSA to the second neighboring [router] *network node*;

generate a second LSA [comprising] *describing* the first link and a third link between the [router] *network node* and an additional [router] *network node but containing no information about the second link to hide the second link from the first neighboring network node when the second LSA is received by the first neighboring network node*; and send the second LSA to the first neighboring [router] *network node, and* wherein the additional router *network node* is also located within the [area, and wherein the second neighboring router contains information regarding the additional router and the third link] *AS*.

14. The [router] *network node* of claim 13, wherein the first LSA comprises an I bit flag with a value of one.

15. The [router] *network node* of claim 13, wherein the additional [router] *network node* is not directly connected to the [router] *network node*, and wherein the third link is a virtual link.

16. The [router] *network node* of claim 13, wherein the [router and the] second neighboring [router are] *network node is* located within [a common topology transparent zone (TTZ)] *the TTZ*, and wherein the first neighboring [router] *network node* is located outside the TTZ.

*17. The network node of claim 13, wherein the information of the second link is not sent to the first neighboring network node.*

*18. The network node of claim 13, wherein the first LSA is not sent to the first neighboring network node.*

*19. The network node of claim 13, wherein the second LSA does not describe the information of the second link.*

*20. The network node of claim 13, wherein the second neighboring network node contains information regarding the additional network node and the third link.*

*21. The network node of claim 13, wherein the first LSA comprises:*

*a first router link field describing the first link, wherein the first router link field comprises a bit flag to indicate the first link is external to the TTZ; and*

*a second router link field describing the second link, wherein the second router link field comprises a bit flag to indicate the second link is internal to the TTZ.*

*22. The network node of claim 13, wherein the first LSA comprises a number of router link fields, wherein each router link field comprises a bit flag, denoted as an I bit flag, to indicate whether a link is external or internal with respect to the TTZ.*

*23. The network node of claim 22, wherein an I bit flag of one indicates an internal link, and wherein an I bit flag of zero indicates an external link.*

*24. An autonomous system (AS) comprising:*

*a topology transparent zone (TTZ) comprising a first TTZ edge node and a TTZ internal node, wherein the first TTZ edge node is connected to the TTZ internal node via an internal link; and*

*an external node connected to the first TTZ edge node via an external link, wherein the TTZ edge node is configured to distribute:*

*a first link state advertisement (LSA) to the external node, the first LSA describing the external link but containing no information about the internal link to hide the internal link from the external node when the first LSA is received by the external node; and*

*a second LSA to the TTZ internal node, the second LSA describing the external link and the internal link and including a LSA header, the LSA header containing a link state type field and a number of router link fields, wherein each router link field comprises a bit flag, denoted as an I bit flag, to indicate whether a link is external or internal with respect to the TTZ.*

*25. The AS of claim 24, wherein an I bit flag of one indicates an internal link, and wherein an I bit flag of zero indicates an external link.*

*26. The AS of claim 24, wherein the TTZ further comprises a second TTZ edge node that is not directly connected to the first TTZ edge node, and wherein the first LSA describes a virtual link between the first TTZ edge node and the second TTZ edge node.*

* * * * *